United States Patent
Kim

(10) Patent No.: US 11,894,887 B2
(45) Date of Patent: Feb. 6, 2024

(54) METHOD AND COMMUNICATION DEVICE FOR TRANSMITTING AND RECEIVING CAMERA DATA AND SENSOR DATA

(71) Applicant: LG ELECTRONICS INC., Seoul (KR)

(72) Inventor: Cheolseung Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 136 days.

(21) Appl. No.: 17/753,056

(22) PCT Filed: Aug. 27, 2019

(86) PCT No.: PCT/KR2019/010900
§ 371 (c)(1),
(2) Date: Feb. 16, 2022

(87) PCT Pub. No.: WO2021/040069
PCT Pub. Date: Mar. 4, 2021

(65) Prior Publication Data
US 2022/0294494 A1    Sep. 15, 2022

(51) Int. Cl.
*H04B 7/0404* (2017.01)
*H04W 4/38* (2018.01)
(Continued)

(52) U.S. Cl.
CPC ............ *H04B 7/0404* (2013.01); *H04W 4/38* (2018.02); *H04W 28/0231* (2013.01); *H04W 28/22* (2013.01)

(58) Field of Classification Search
CPC ..... H04B 7/0404; H04B 17/309; H04W 4/38; H04W 28/0231; H04W 28/22
(Continued)

(56) References Cited

U.S. PATENT DOCUMENTS

2016/0014793 A1* 1/2016 Klemp ............... H04W 48/18
                                                       370/329
2016/0173805 A1   6/2016 Claus et al.
(Continued)

FOREIGN PATENT DOCUMENTS

EP         3852404 A1 *  7/2021
KR     1020130141923     12/2013
(Continued)

OTHER PUBLICATIONS

PCT International Application No. PCT/KR2019/010900, International Search Report dated May 27, 2020, 2 pages.

*Primary Examiner* — Jean B Corrielus
(74) *Attorney, Agent, or Firm* — LEE, HONG, DEGERMAN, KANG & WAIMEY

(57) ABSTRACT

An embodiment of the present specification provides a TCU mounted in a vehicle. The TCU comprises: a plurality of transmission and reception units comprising one or more antennas; and a processor for controlling the plurality of transmission and reception units. The processor can carry out the steps of: receiving channel state information with respect to a wireless channel; determining a maximum data rate available for data transmission with respect to the base station; determining a data rate of at least one camera and a data rate of at least one sensor; and receiving camera data from the at least one camera and receiving sensor data from the at least one sensor.

13 Claims, 21 Drawing Sheets

(51) Int. Cl.
*H04W 28/02* (2009.01)
*H04W 28/22* (2009.01)

(58) Field of Classification Search
CPC ....... H04W 72/56; H04W 4/40; H04W 28/02; H04W 28/10; H04W 72/542; H04W 88/18
See application file for complete search history.

(56) References Cited

U.S. PATENT DOCUMENTS

| | | |
|---|---|---|
| 2017/0064591 A1 | 3/2017 | Padfield et al. |
| 2020/0153655 A1* | 5/2020 | Ogawa .................... H04W 4/40 |

FOREIGN PATENT DOCUMENTS

| | | |
|---|---|---|
| KR | 1020160112544 | 9/2016 |
| KR | 1020180053081 | 5/2018 |

* cited by examiner

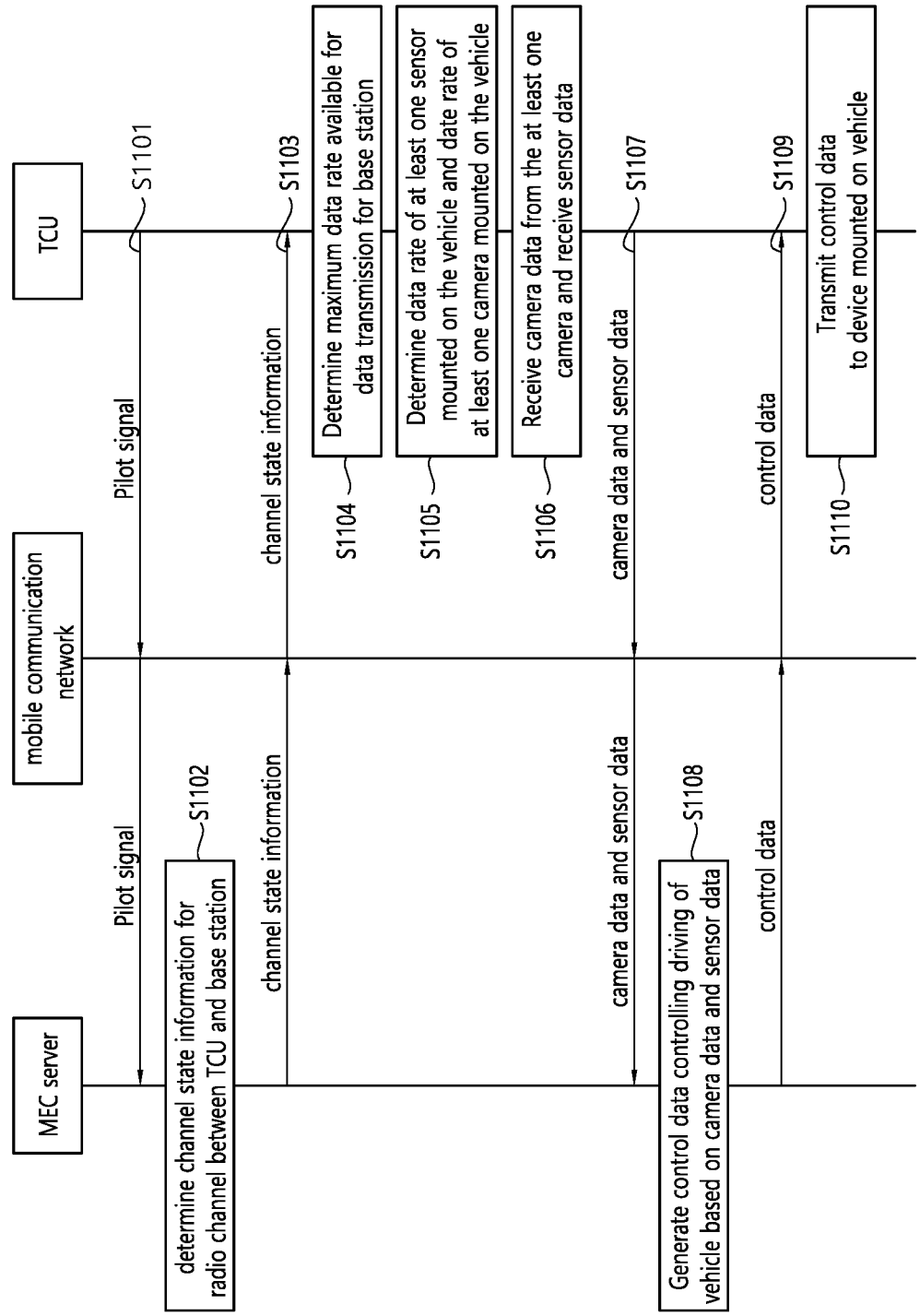

FIG. 13a

| Device | Priority | Data rate according to Category | | | |
|---|---|---|---|---|---|
| | | Category1 | Category2 | Category3 | Category4 |
| Camera1 | 6 | (10Mbps) | 100Mbps | 1.49Gbps | 2.89Gbps |
| Camera2 | 3 | 10Mbps | 100Mbps | (1.49Gbps) | 2.89Gbps |
| Camera3 | 7 | (1Mbps) | 2Mbps | 10Mbps | 100Mbps |
| Lidar1 | 1 | 5Mbps | 50Mbps | 500Mbps | (5Gbps) |
| Lidar2 | 4 | 10Mbps | (100Mbps) | 1Gbps | 10Gbps |
| Radar1 | 2 | 50Mbps | 500Mbps | (1Gbps) | 5Gbps |
| Radar2 | 5 | 100Mbps | (1Gbps) | 3Gbps | 10Gbps |

FIG. 13b

| Device | Priority | Data rate according to Category ||||
| --- | --- | --- | --- | --- | --- |
| | | Category1 | Category2 | Category3 | Category4 |
| Camera1 | 6 | 10Mbps | 100Mbps | 1.49Gbps | 2.89Gbps |
| Camera2 | 3 | 10Mbps | ~~100Mbps~~ → | ~~1.49Gbps~~ | 2.89Gbps |
| Camera3 | 7 | 1Mbps | 2Mbps | 10Mbps | 100Mbps |
| Lidar1 | 1 | 5Mbps | 50Mbps | 500Mbps | ~~5Gbps~~ → |
| Lidar2 | 4 | 10Mbps | ~~100Mbps~~ → | 1Gbps | 10Gbps |
| Radar1 | 2 | 50Mbps | 500Mbps | ~~1Gbps~~ → | 5Gbps |
| Radar2 | 5 | 100Mbps | ~~1Gbps~~ | 3Gbps | 10Gbps |

METHOD AND COMMUNICATION DEVICE FOR TRANSMITTING AND RECEIVING CAMERA DATA AND SENSOR DATA

CROSS-REFERENCE TO RELATED APPLICATIONS

This application is the National Stage filing under 35 U.S.C. 371 of International Application No. PCT/KR2019/010900, filed on Aug. 27, 2019, the contents of which are all incorporated by reference herein in its entirety.

TECHNICAL FIELD

The present disclosure generally relates to mobile communication.

BACKGROUND

Thanks to the success of Evolved Universal Terrestrial Radio Access Network (E-UTRAN), that is, long term evolution (LTE)/LTE-Advanced (LTE-A) for 4G mobile communication, interest in next-generation, that is, 5G (so-called 5G) mobile communication is increasing, and research is being conducted one after another.

For the fifth generation (so-called 5G) mobile communication, a new radio access technology (New RAT or NR) has been studied. In particular, automotive driving is expected to become an important new driving force for 5G with various use cases of mobile communication for vehicles.

In the case of autonomous driving, where the server remotely controls the vehicle, it should take less than 5 msec, until the vehicle transmits data to the server, the vehicle receives control data from this server and the vehicle operates.

However, in the conventional cloud server-based network structure (eg, base station-wired network-cloud server), there is a problem that it takes about 30-40 msec for operations that the base station transmits the data received from the vehicle to the cloud server, the cloud server analyzes the data in the cloud server, the cloud server transmits the data to the base station, and the base station receives the data.

In order to improve the conventional network structure and achieve URLLC, ETSI (European Telecommunications Standards Institute) and 5GAA are discussing about Multi-access Edge Computing (MEC). However, there has not been a method in which data transmission/reception between the MEC server and the TCU mounted on the vehicle can be performed quickly and efficiently.

For example, the TCU receives camera data and sensor data from at least one camera and sensor (eg, lidar sensor, radar sensor, etc.) mounted on the vehicle, and transmits the received camera data and sensor data to the MEC server. The MEC server may perform object detection for camera and sensor data by using an autonomous driving algorithm such as a deep learning algorithm. In addition, the MEC server may generate control data for controlling the driving of the vehicle (including control commands for controlling the speed and direction of the vehicle) based on the object detection result. At this time, in order to increase the accuracy of object detection, automobile manufacturers are requesting that the TCU transmit camera data and sensor data in high resolution like raw data. However, there has not been a method in which the TCU transmits camera data in high resolution in consideration of the importance of the camera and sensor mounted on the vehicle, the channel state between the TCU and the base station, or the driving state of the vehicle.

SUMMARY

Accordingly, a disclosure of the present specification has been made in an effort to solve the aforementioned problem.

In order to achieve the above object, one disclosure of the present specification provides a TCU mounted on a vehicle. The TCU includes a plurality of transceivers including one or more antennas; and a processor for controlling the plurality of transceivers, wherein the processor controls the plurality of transceivers to perform: receiving channel state information for a radio channel between the TCU and the base station from the base station; determining a maximum data rate available for data transmission to the base station based on the received channel state information; determining a data rate of at least one camera mounted on the vehicle and a data rate of at least one sensor mounted on the vehicle, wherein the data rate of the at least one camera and the data rate of the at least one sensor is determined based on a priority for the at least one camera and the at least one sensor and the determined maximum data rate; and controlling the plurality of transceivers to receive camera data from the at least one camera based on the data rate of the at least one camera, and sensor data from the at least one sensor based on the data rate of the at least one sensor.

The processor may further perform a process of controlling the plurality of transceivers to transmit the received camera data and the received sensor data to the base station.

The processor may further perform a process of controlling the plurality of transceivers to transmit information on the data rate of the at least one camera and the data rate of the at least one sensor to the base station.

The processor may further perform a process of receiving, from the base station, information on the data rate allocated to the TCU by a multi-access edge computing (MEC) server by controlling the plurality of transceivers.

The processor is further configured to perform: adjusting the data rate of the at least one camera and the data rate of the at least one sensor, based on the priority of the at least one camera and the at least one sensor and the information on the data rate allocated to the TCU.

The at least one sensor may include at least one RADAR sensor and at least one LIDAR sensor.

The processor may further perform a process of setting priorities for the at least one camera and the at least one sensor based on the driving speed of the vehicle.

The processor may control the plurality of transceivers to transmit a pilot signal to the base station, wherein the received channel state information is generated by the MEC server based on the pilot signal.

To the vehicle, at least one of a Domain Control Unit (DCU), an Electronic Control Unit (ECU), a Local Interconnect Network (LIN) master, a LIN slave, a Media Oriented System Transport (MOST) master, a MOST slave, an Ethernet switch, a radar sensor, a lidar sensor, At least one of a camera, audio, video, navigation (AVN), and rear side entertainment (RSE) may be mounted.

The plurality of transceivers may include a long term evolution (LTE) transceiver, a 5G transceiver, and a Wi-Fi transceiver.

In order to achieve the above object, one disclosure of the present specification provides a server for controlling a Telematics Communication Unit (TCU) mounted on a vehicle in a next-generation mobile communication system.

The server includes a transceiver; and a processor for controlling the transceiver, wherein the processor is configured to perform: receiving a pilot signal transmitted by the TCU to a base station from a mobile communication network including the base station; determining status information on a radio channel between the TCU and the base station based on the received pilot signal; transmitting status information on the determined radio channel to the mobile communication network including the base station; receiving camera data and sensor data transmitted by the TCU from the mobile communication network including the base station; and generating control data for controlling driving of the vehicle based on the camera data and the sensor data.

The processor may further perform a process of transmitting the generated control data to the TCU through the mobile communication network including the base station.

The processor may further perform a process of receiving information on a data rate of at least one camera mounted on the vehicle and a data rate of at least one sensor mounted on the vehicle.

The processor may further perform a process of allocating a data rate to the TCU based on a sum of the data rate of the at least one camera and the data rate of the at least one sensor.

The processor may further perform a process of controlling the transceiver to transmit information on the data rate allocated to the TCU to the TCU through the mobile communication network including the base station.

The server may be a multi-access edge computing (MEC) server.

According to the disclosure of the present specification, the existing problems are solved.

BRIEF DESCRIPTION OF THE DRAWINGS

FIG. 11 is a signal flow diagram illustrating an example of the operation of the TCU, the MEC server, and the mobile communication network according to the disclosure of the present specification.

FIG. 13a is an example of a table showing data rates according to priorities, categories, and categories of cameras and sensors mounted on a vehicle.

FIG. 13b is an example in which the TCU adjusts the data rate of the table of FIG. 13a according to S1208 of FIG. 12b.

DESCRIPTION OF EXEMPLARY EMBODIMENTS

Figure 1:
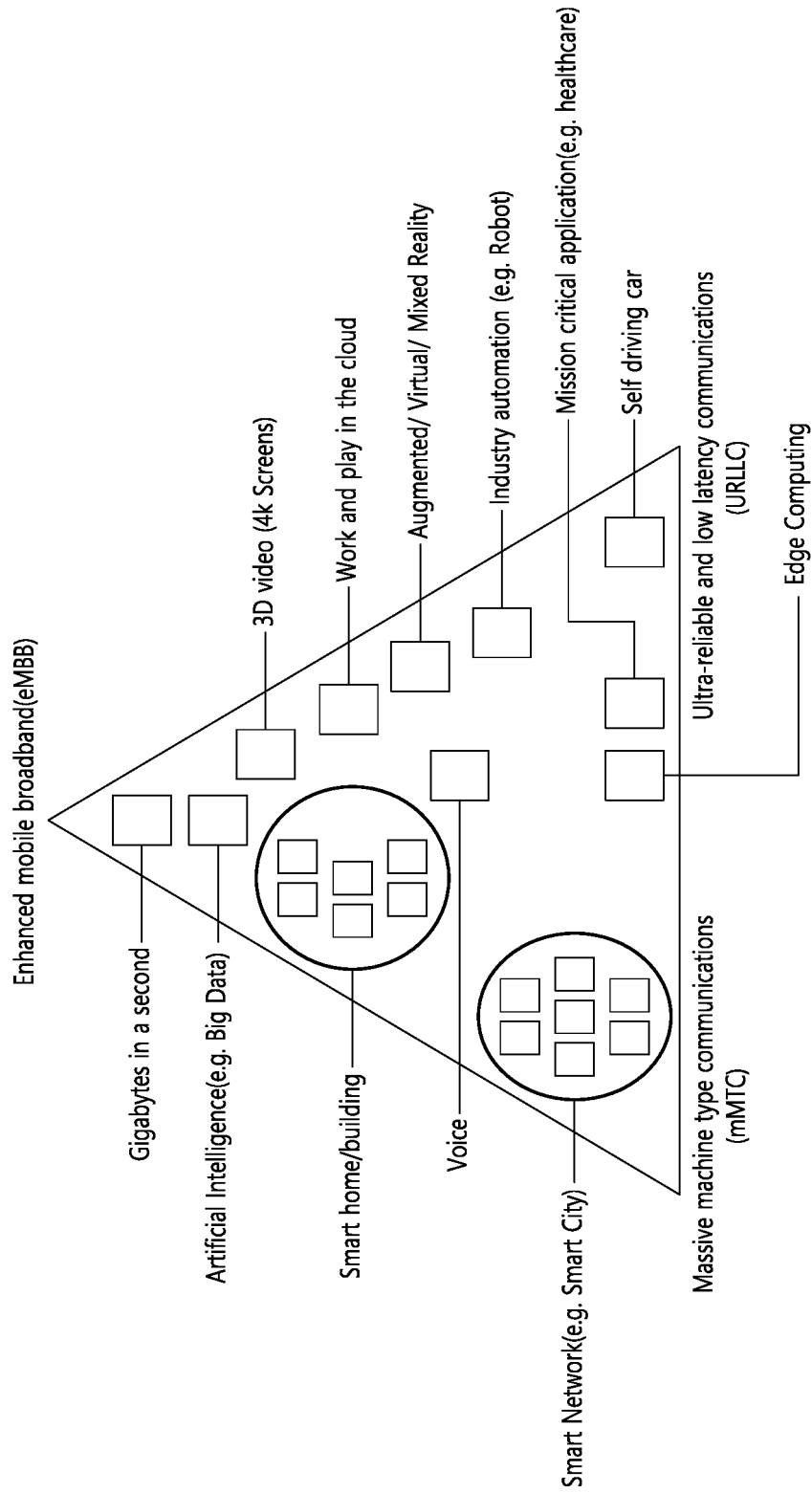
FIG. 1 shows an example of a 5G usage scenario.

Hereinafter, it is described that the present disclosure is applied based on 3rd Generation Partnership Project (3GPP) 3GPP long term evolution (LTE), 3GPP LTE-A (LTE-Advanced), Wi-Fi or 3GPP NR (New RAT, that is, 5G) do. This is merely an example, and the present disclosure can be applied to various wireless communication systems. Hereinafter, LTE includes LTE and/or LTE-A.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

A base station, a term used below, generally refers to a fixed station that communicates with a wireless device, and may be called other terms such as an evolved-NodeB (eNodeB), an evolved-NodeB (eNB), a BTS (Base Transceiver System), an access point (Access Point) and gNB (Next generation NodeB).

And, hereinafter, the term UE (User Equipment) used may be fixed or mobile, and may include a device, a wireless device, a wireless communication device, a terminal, and an MS (mobile station), UT (user terminal), SS (subscriber station), MT (mobile terminal), etc may be called as other terms.

FIG. 1 Shows an Example of a 5G Usage Scenario.

FIG. 1 shows an example of a 5G usage scenario to which the technical features of the present disclosure can be applied. The 5G usage scenario shown in FIG. 1 is merely exemplary, and the technical features of the present disclosure can be applied to other 5G usage scenarios not shown in FIG. 1.

Referring to FIG. 1, the three main requirements areas of 5G are (1) enhanced mobile broadband (eMBB) domain, (2) massive machine type communication (mMTC) area domain and (3) includes ultra-reliable and low latency communications (URLLC) domains. Some use cases may require multiple domains for optimization, while other use cases may focus on only one key performance indicator (KPI). 5G supports these various use cases in a flexible and reliable way.

eMBB focuses on overall improvements in data rates, latency, user density, capacity and coverage of mobile broadband connections. eMBB aims for a throughput of around 10 Gbps. eMBB goes far beyond basic mobile Internet access, covering rich interactive work, media and entertainment applications in the cloud or augmented reality. Data is one of the key drivers of 5G, and for the first time in the 5G era, we may not see dedicated voice services. In 5G, voice is simply expected to be processed as an application using the data connection provided by the communication system. The main reasons for the increased amount of traffic are the increase in content size and the increase in the number of applications requiring high data rates. Streaming services (audio and video), interactive video and mobile Internet connections will become more widely used as more devices connect to the Internet. Many of these applications require always-on connectivity to push real-time information and notifications to users. Cloud storage and applications are growing rapidly in mobile communication platforms, which can be applied to both work and entertainment. Cloud storage is a special use case that drives the growth of uplink data rates. 5G is also used for remote work in the cloud, requiring much lower end-to-end latency to maintain a good user experience when tactile interfaces are used. In entertainment, for example, cloud gaming and video streaming are another key factor increasing the demand for mobile broadband capabilities. Entertainment is essential on smartphones and tablets anywhere, including in high-mobility environments such as trains, cars and airplanes. Another use example is augmented reality for entertainment and information retrieval. Here, augmented reality requires very low latency and instantaneous amount of data.

mMTC is designed to enable communication between a large number of low-cost devices powered by batteries and is intended to support applications such as smart metering, logistics, field and body sensors. mMTC is targeting a battery life of 10 years or so and/or a million devices per square kilometer. mMTC enables seamless connectivity of embedded sensors in all fields and is one of the most anticipated 5G use cases. Potentially, by 2020, there will be 20.4 billion IoT devices. Industrial IoT is one of the areas where 5G will play a major role in enabling smart cities, asset tracking, smart utilities, agriculture and security infrastructure.

URLLC is ideal for vehicular communications, industrial control, factory automation, telesurgery, smart grid, and public safety applications by allowing devices and machines to communicate very reliably, with very low latency and with high availability. URLLC aims for a delay on the order of 1 ms. URLLC includes new services that will transform the industry through ultra-reliable/low-latency links such as remote control of critical infrastructure and autonomous vehicles. This level of reliability and latency is essential for smart grid control, industrial automation, robotics, and drone control and coordination.

Next, a plurality of usage examples included in the triangle of FIG. 1 will be described in more detail.

5G could complement fiber-to-the-home (FTTH) and cable-based broadband (or DOCSIS) as a means of delivering streams rated at hundreds of megabits per second to gigabits per second. Such high speed may be required to deliver TVs with resolutions of 4K or higher (6K, 8K and higher) as well as virtual reality (VR) and augmented reality (AR). VR and AR applications almost include immersive sports events. Certain applications may require special network settings. For VR games, for example, game companies may need to integrate core servers with network operators' edge network servers to minimize latency.

Smart cities and smart homes, referred to as smart societies, will be embedded with high-density wireless sensor networks. A distributed network of intelligent sensors will identify conditions for keeping a city or house cost- and energy-efficient. A similar setup can be performed for each household. Temperature sensors, window and heating controllers, burglar alarms and appliances are all connected wirelessly. Many of these sensors typically require low data rates, low power and low cost. However, for example, real-time HD video may be required in certain types of devices for surveillance.

The consumption and distribution of energy, including heat or gas, is highly decentralized, requiring automated control of distributed sensor networks. Smart grids use digital information and communication technologies to interconnect these sensors to collect information and act on it. This information can include supplier and consumer behavior, enabling smart grids to improve efficiency, reliability, economics, sustainability of production and distribution of fuels such as electricity in an automated manner. The smart grid can also be viewed as another low-latency sensor network.

The health sector has many applications that can benefit from mobile communications. The communication system may support telemedicine providing clinical care from a remote location. This can help reduce barriers to distance and improve access to consistently unavailable health care services in remote rural areas. It is also used to save lives in critical care and emergency situations. A wireless sensor network based on mobile communication may provide remote monitoring and sensors for parameters such as heart rate and blood pressure.

Wireless and mobile communications are becoming increasingly important in industrial applications. Wiring is expensive to install and maintain. Thus, the possibility of replacing cables with reconfigurable radio links is an attractive opportunity for many industries. Achieving this, however, requires that wireless connections operate with cable-like delays, reliability and capacity, and that their management is simplified. Low latency and very low error probability are new requirements that need to be connected with 5G.

Logistics and freight tracking are important use cases for mobile communications that use location-based information systems to enable tracking of inventory and packages from anywhere. Logistics and freight tracking use cases typically require low data rates but require wide range and reliable location information.

In particular, automotive is expected to become an important new driving force for 5G with many use cases for mobile communication to vehicles. For example, entertainment for passengers requires both high capacity and high mobile broadband. The reason is that future users continue to expect high-quality connections regardless of their location and speed. Another example of use in the automotive sector is augmented reality dashboards. The augmented reality contrast board allows drivers to identify objects in the dark above what they are seeing through the front window. The augmented reality dashboard displays information to inform the driver about the distance and movement of objects by superimposing the information on the front window. In the future, wireless modules will enable communication between vehicles, information exchange between vehicles and supporting infrastructure, and information exchange between vehicles and other connected devices (eg, devices carried by pedestrians). Safety systems can lower the risk of accidents by guiding drivers through alternative courses of action to help them drive safer. The next step will be remote-controlled vehicles or autonomous vehicles. This requires very reliable and very fast communication between different autonomous vehicles and/or between vehicles and infrastructure. In the future, autonomous vehicles will perform all driving activities, allowing drivers to focus only on traffic anomalies that the vehicle itself cannot identify. The technological requirements of autonomous vehicles require ultra-low latency and ultra-fast reliability to increase traffic safety to unattainable levels for humans.

Figure 2:
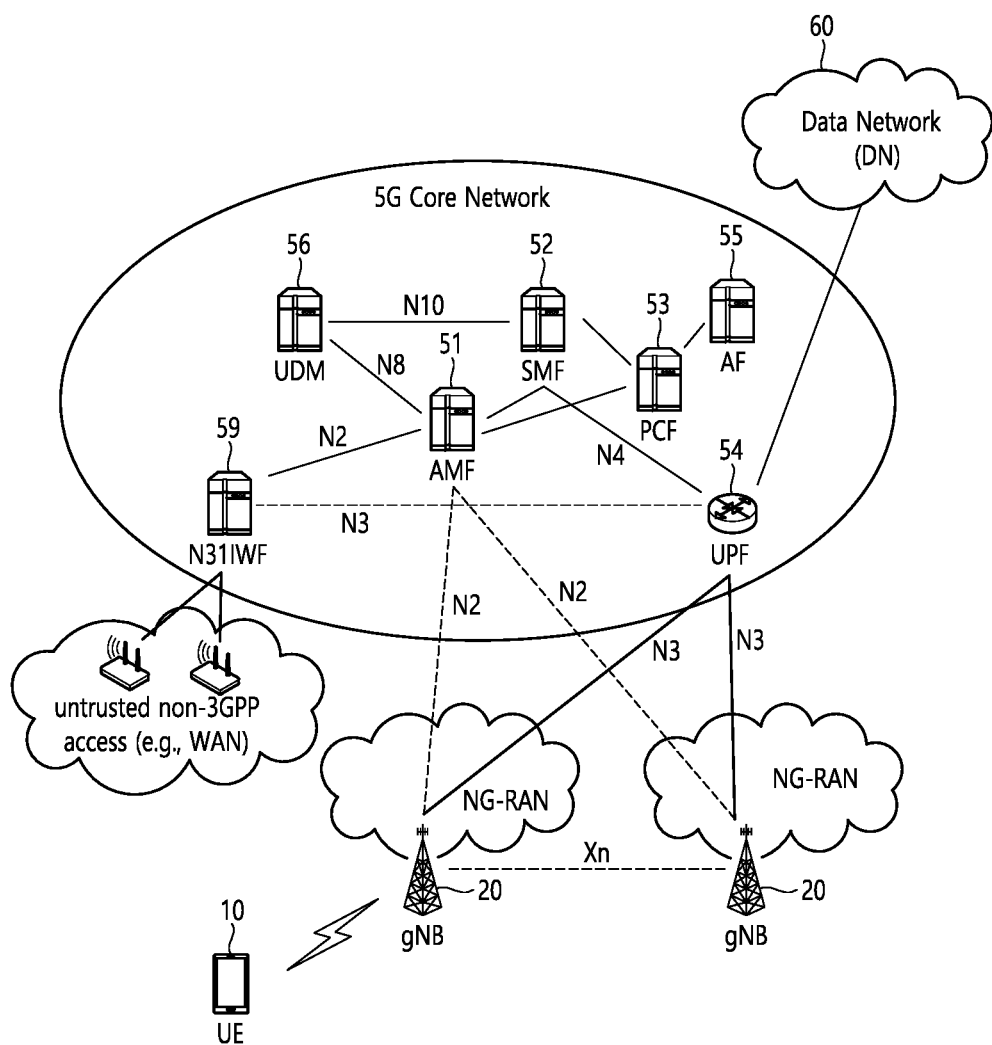
FIG. 2 is a structural diagram of a next-generation mobile communication network.

FIG. 2 is a Structural Diagram of a Next-Generation Mobile Communication Network.

A next-generation mobile communication network (5G System) may include various components, and in FIG. 2, AMF (Access and Mobility Management Function) 51 and SMF (session management function), Session Management Function (52), PCF (Policy Control Function) (53), AF (Application Function: Application Function) (55), N3IWF (Non-3GPP Interworking Function: Non-3GPP Interworking Function) 59, a UPF (User Plane Function) 54, a UDM (Unified Data Management), and data network 56 corresponding to some of the various components are shown.

The UE 10 is connected to the data network 60 via the UPF 55 through a Next Generation Radio Access Network (NG-RAN) including the gNB 20.

The UE 10 may be provided with a data service even through untrusted non-3GPP access, e.g., a wireless local area network (WLAN). In order to connect the non-3GPP access to a core network, the N3IWF 59 may be deployed.

The illustrated N3IWF performs a function of managing interworking between the non-3GPP access and the 5G system. When the UE 10 is connected to non-3GPP access (e.g., WiFi referred to as IEEE 801.11), the UE 10 may be connected to the 5G system through the N3IWF. The N3IWF performs control signaling with the AMF and is connected to the UPF through an N3 interface for data transmission.

The illustrated AMF may manage access and mobility in the 5G system. The AMF may perform a function of managing Non-Access Stratum (NAS) security. The AMF may perform a function of handling mobility in an idle state.

The illustrated UPF is a type of gateway through which user data is transmitted/received. The UPF may perform the entirety or a portion of a user plane function of a serving gateway (S-GW) and a packet data network gateway (P-GW) of 4G mobile communication.

The UPF operates as a boundary point between a next generation radio access network (NG-RAN) and the core network and maintains a data path between the gNB 20 and the SMF. In addition, when the UE 10 moves over an area served by the gNB 20, the UPF serves as a mobility anchor point. The UPF may perform a function of handling a PDU. For mobility within the NG-RAN (which is defined after 3GPP Release-15), the UPF may route packets. In addition, the UPF may also serve as an anchor point for mobility with another 3GPP network (RAN defined before 3GPP Release-15, e.g., universal mobile telecommunications system (UMTS) terrestrial radio access network (UTRAN), evolved (E)-UTRAN or global system for mobile communication (GERAN)/enhanced data rates for global evolution (EDGE) RAN. The UPF may correspond to a termination point of a data interface toward the data network.

The illustrated PCF is a node that controls an operator's policy.

The illustrated AF is a server for providing various services to the UE 10.

The illustrated UDM is a kind of server that manages subscriber information, such as home subscriber server (HSS) of 4G mobile communication. The UDM stores and manages the subscriber information in a unified data repository (UDR).

The illustrated SMF may perform a function of allocating an Internet protocol (IP) address of the UE. In addition, the SMF may control a protocol data unit (PDU) session.

Figure 3:
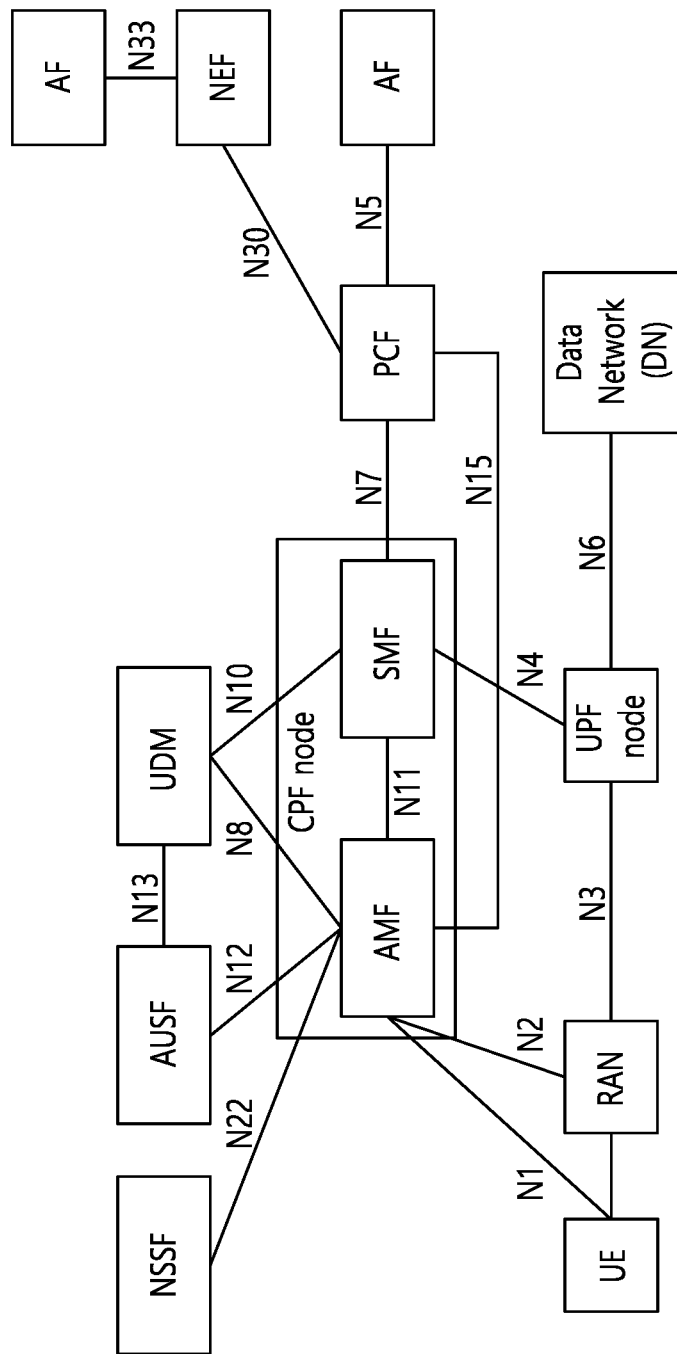
FIG. 3 is an exemplary diagram illustrating an expected structure of a next-generation mobile communication network from the viewpoint of a node.

FIG. 3 is an Exemplary Diagram Illustrating an Expected Structure of a Next-Generation Mobile Communication Network from the Viewpoint of a Node.

As can be seen with reference to FIG. 3, the UE is connected to a data network (DN) through a next-generation RAN (Radio Access Network).

The illustrated control plane function (CPF) node performs all or part of the functions of the Mobility Management Entity (MME) of the 4th generation mobile communication, and all or part of the control plane functions of the Serving Gateway (S-GW) and all or part of the control plane functions of the PDN Gateway (P-GW). The CPF node includes an AMF and an SMF.

The illustrated Authentication Server Function (AUSF) authenticates and manages the UE.

The illustrated network slice selection function (Network Slice Selection Function: NSSF) is a node for network slicing introduced in 5G.

The illustrated Network Exposure Function (NEF) is a node for providing a mechanism for securely exposing the services and functions of the 5G core. For example, NEF may expose functions and events, securely provide information from external applications to the 3GPP network, translate internal/external information, provides control plane parameters, and manage packet flow description (PFD).

Figure 4:
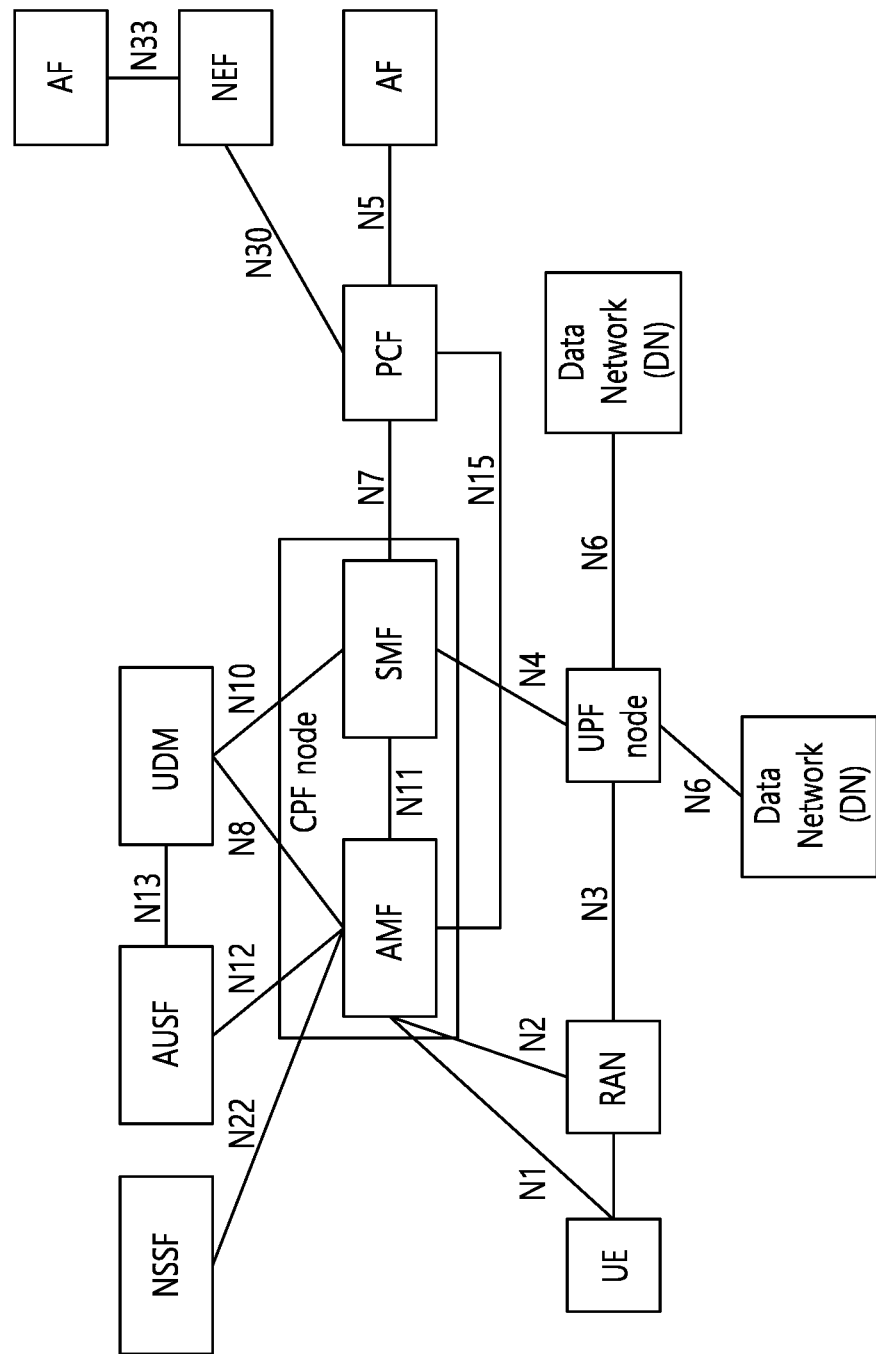
FIG. 4 is an exemplary diagram illustrating an architecture for supporting simultaneous access to two data networks.

In FIG. 4, a UE may simultaneously access two data networks using multiple protocol data unit (PDU) sessions.

FIG. 4 is an Exemplary Diagram Illustrating an Architecture for Supporting Simultaneous Access to Two Data Networks.

FIG. 4 Shows an Architecture for a UE to Simultaneously Access Two Data Networks Using One PDU Session.

For reference, a description of the reference point shown in FIGS. 2 to 4 is as follows.

N1: Reference point between UE and AMF
N2: Reference point between NG-RAN and AMF
N3: Reference point between NG-RAN and UPF
N4: Reference point between SMF and UPF
N5: Reference point between PCF and AF
N6: Reference point between UPF and DN
N7: Reference point between SMF and PCF
N8: Reference point between UDM and AMF
N10: Reference point between UDM and SMF
N11: Reference point between AMF and SMF
N12: Reference point between AMF and AUSF
N13: Reference point between UDM and AUSF
N15: In a non-roaming scenario, a reference point between the PCF and the AMF. In a roaming scenario, the reference point between the AMF and the PCF of the visited network
N22: Reference point between AMF and NSSF
N30: Reference point between PCF and NEF
N33: Reference point between AF and NEF In FIGS. 3 and 4, the AF by a third party other than the operator may be connected to the 5GC through the NEF.

Figure 5:
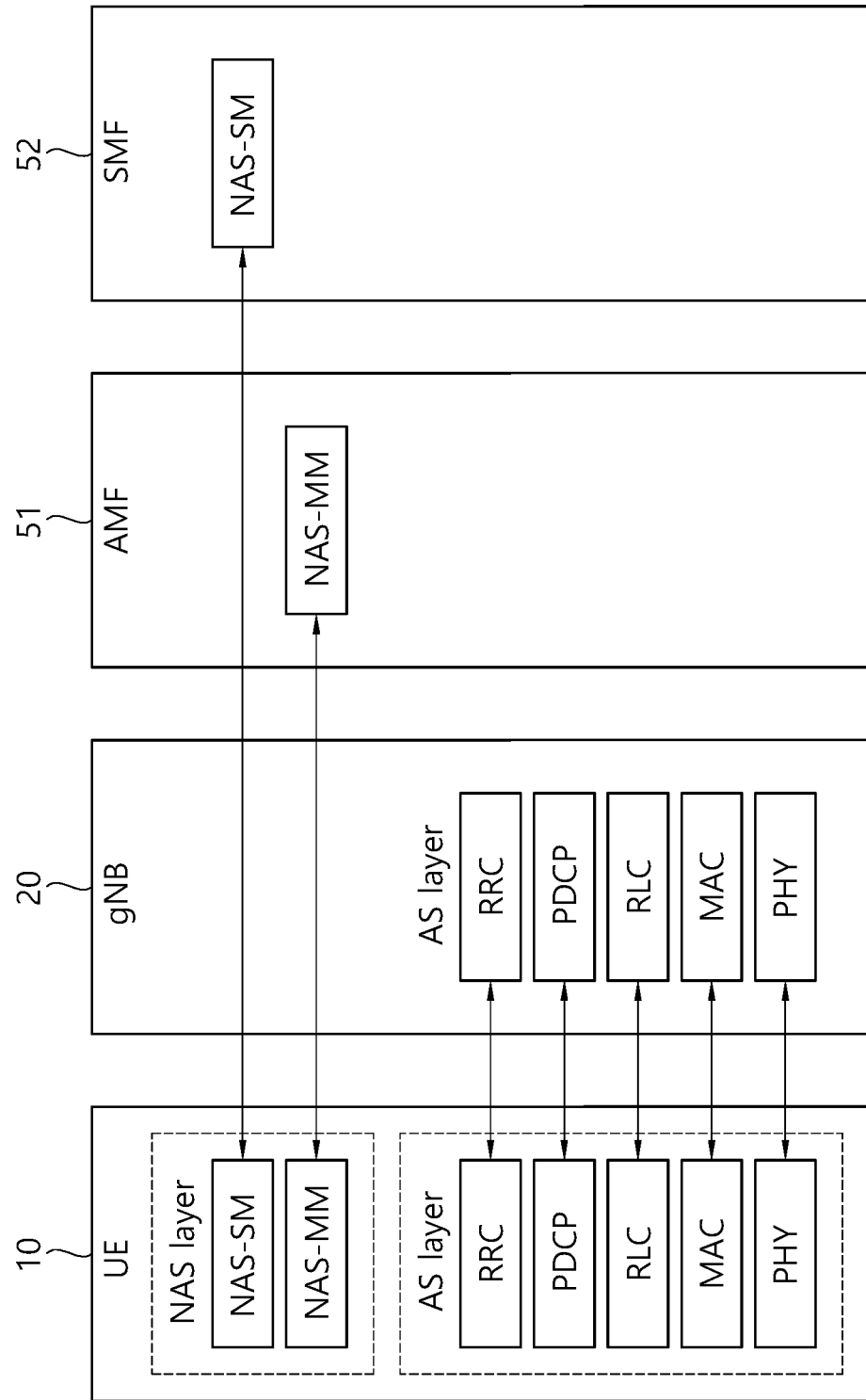
FIG. 5 is another exemplary diagram showing a structure of a radio interface protocol between a UE and a gNB.

FIG. 5 is Another Exemplary Diagram Showing a Structure of a Radio Interface Protocol Between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the open system interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. In addition, data is transmitted between different physical layers, that is, between the physical layers of a transmitting side and a receiving side through a physical channel.

The second layer includes a medium access control (MAC) layer, a radio link control (RLC) layer, and a packet data convergence protocol (PDCP) layer.

The third layer includes radio resource control (hereinafter abbreviated as RRC). The RRC layer is defined only in the control plane and is in charge of control of logical channels, transport channels, and physical channels related to configuration, reconfiguration and release of radio bearers. In this case, RB refers to a service provided by the second layer for data transfer between the UE and the E-UTRAN.

The NAS layer performs functions such as connection management (session management) and mobility management.

The NAS layer is divided into a NAS entity for mobility management (MM) and a NAS entity for session management (SM).

1) NAS entity for MM provides the following functions in general.
   NAS procedures related to AMF include the following.
   Registration management and access management procedures. AMF supports the following functions.
   Secure NAS signal connection between UE and AMF (integrity protection, encryption)

2) The NAS entity for SM performs session management between the UE and the SMF.

The SM signaling message is processed, that is, generated and processed, at an NAS-SM layer of the UE and SMF. The contents of the SM signaling message are not interpreted by the AMF.

In the case of SM signaling transmission,
   The NAS entity for the MM creates a NAS-MM message that derives how and where to deliver an SM signaling message through a security header representing the NAS transmission of SM signaling and additional information on a received NAS-MM.
   Upon receiving SM signaling, the NAS entity for the SM performs an integrity check of the NAS-MM message, analyzes additional information, and derives a method and place to derive the SM signaling message.

Meanwhile, in FIG. 5, the RRC layer, the RLC layer, the MAC layer, and the PHY layer located below the NAS layer are collectively referred to as an access stratum (AS).

On the other hand, in order to achieve the URLLC stipulated in 5GAA (5G Automotive Association) and 5G, it should take less than 5 msec for the server to receive vehicle status information from the vehicle and the vehicle to receive control data from the server and the vehicle to operate. That is, operations that the cloud server to collect in-vehicle sensor data, and after analysis is completed, the cloud server to transmit a control command to the TCU (Telematics Communication Unit), and the TCU to deliver it to the target ECU (Electronic Control Unit) must be completed within 5 msec.

In the conventional cloud server-based network structure (eg, base station-wired network-cloud server), it takes about 30-40 msec for operations that data is transmitted from the base station to the cloud server, the cloud server analyzes the data to transmit the data to the base station, and the base station receives it.

To achieve ultra-reliable and low latency communications (URLLC), the European Telecommunications Standards Institute (ETSI) and 5GAA are discussing Multi-access Edge Computing (MEC).

<Multi-Access Edge Computing (MEC)>

MEC is a network architecture that enables cloud computing capabilities and IT service environments at the edge of a cellular network (typically, the edge of any network). The basic idea of MEC is to run applications (applications) and perform processing tasks related to the cellular customer, thereby reducing network congestion and making applications better. MEC technology is designed to be implemented in a cellular base station or other edge node. MEC technology may rapidly and flexibly deploy new applications and new services for customers. MEC enables cellular operators to open a Radio Access network (RAN) to authorized third parties such as application developers and content providers.

The MEC server described in this specification refers to a communication device that provides a cloud computing function or an IT service environment at the edge of a network.

FIGS. 6a to 6d Show an Example Implementation of the MEC Server.

The user plane function (UPF) node 630 of FIGS. 6a to 6d is a type of gateway through which user data is transmitted and received. The UPF node 630 may perform all or part of the user plane functions of a serving-gateway (S-GW) and a packet data network-gateway (P-GW) of 4G mobile communication. The core network 640 may be an Evolved Packet Core (EPC) or a 5G Core Network (5GC). N3 is a reference point between the (R)AN and the UPF node 630. N6 is a reference point between the UPF node 630 and the data network. The base station 620 may be a 5G base station (gNB) or an LTE base station (eNB). The base station 620 may be a base station including both a gNB and an eNB.

The AMF 650 is an Access and Mobility Management Function, and is a Control Plane Function (CPF) for managing access and mobility. The SMF 660 is a Session Management Function and is a control plane function for managing data sessions such as PDU (Protocol Data Unit) sessions.

Logically, the MEC server (MEC host) 610 may be implemented in an edge or central data network. The UPF may perform a role to coordinate user plane (UP) traffic to a target MEC application (application in the MEC server 610) of the data network. The location of the data network and UPF can be selected by the network operator. Network operators may deploy physical computing resources based on technical and business variables such as available facilities, supported applications and application requirements, measured or estimated user loads, and the like. The MEC management system may dynamically determine a location to deploy the MEC application by coordinating the operation of the MEC server 610 (MEC host) and the application.

Figure 6A:
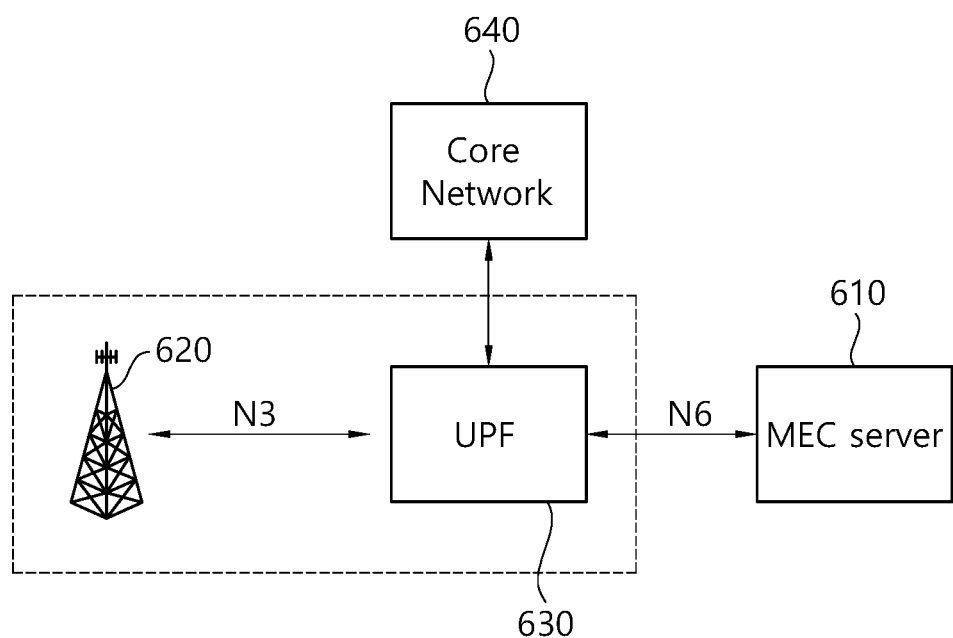
FIGS. 6a to 6d show an example implementation of the MEC server.
Figure 6B:
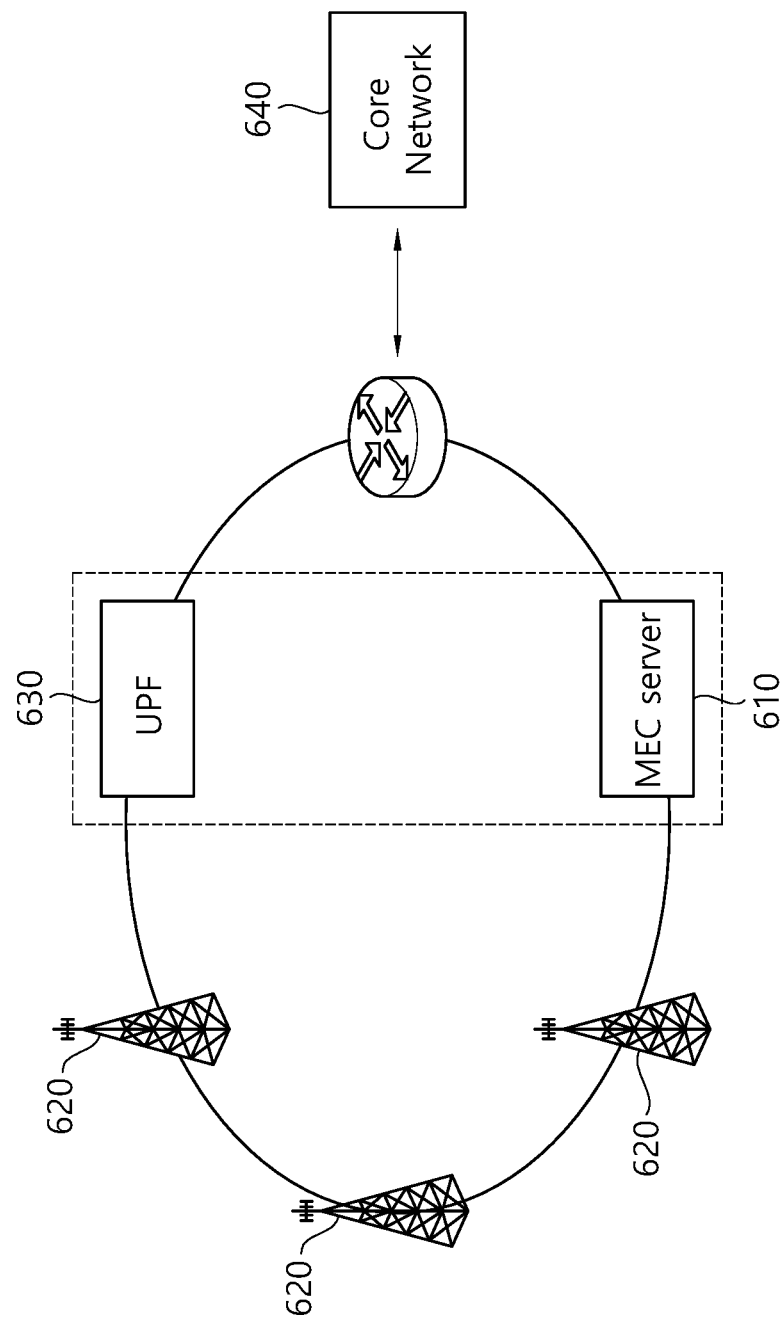
Figure 6C:
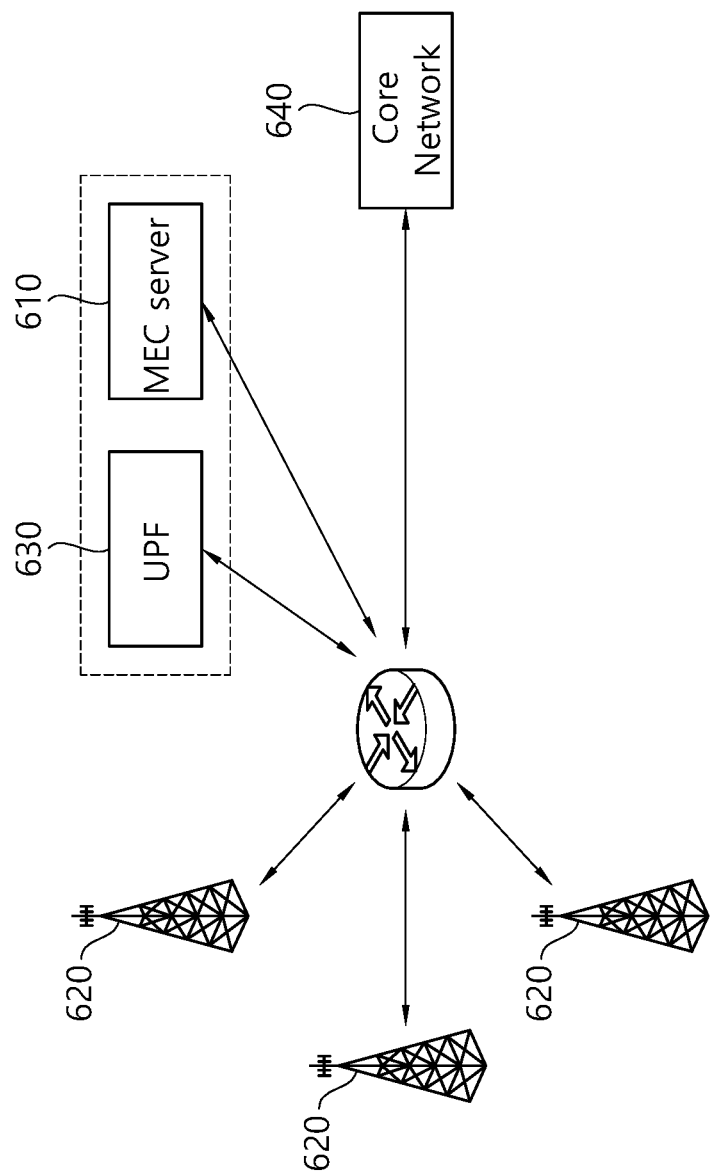
Figure 6D:
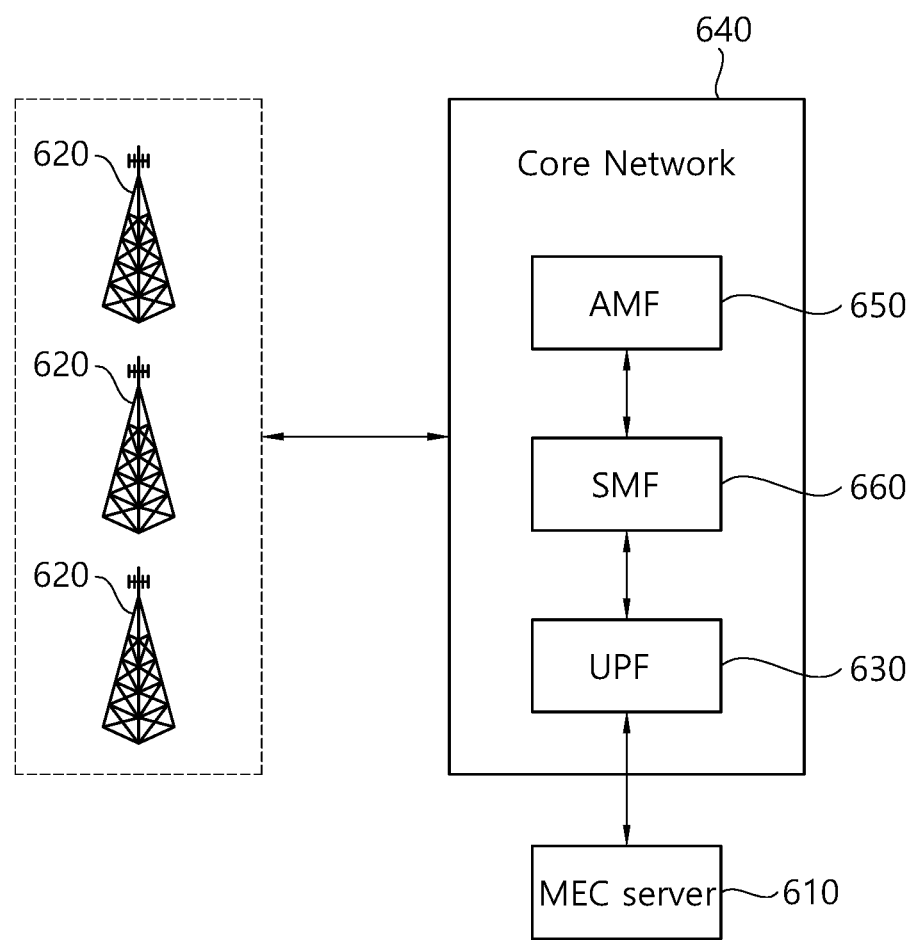

FIG. 6a is an implementation example in which the MEC server 610 and the UPF node 630 are deployed together with the base station 620. FIG. 6b is an example implementation in which the MEC server 610 is co-located with a transmitting node (eg, UPF node 630). In FIG. 6b, the core network 640 may communicate with the UPF node 630 and the MEC server 610 through a network aggregation point. FIG. 6c is an example implementation in which the MEC server 610 and the UPF node 630 are deployed together with a network aggregation point. FIG. 6d is an example implementation in which the MEC server 610 is deployed with core network 640 functions. In FIG. 6d, the MEC server 610 may be deployed in the same data center as the core network 640 functions.

Disclosure of the Present Specification

Figure 7:
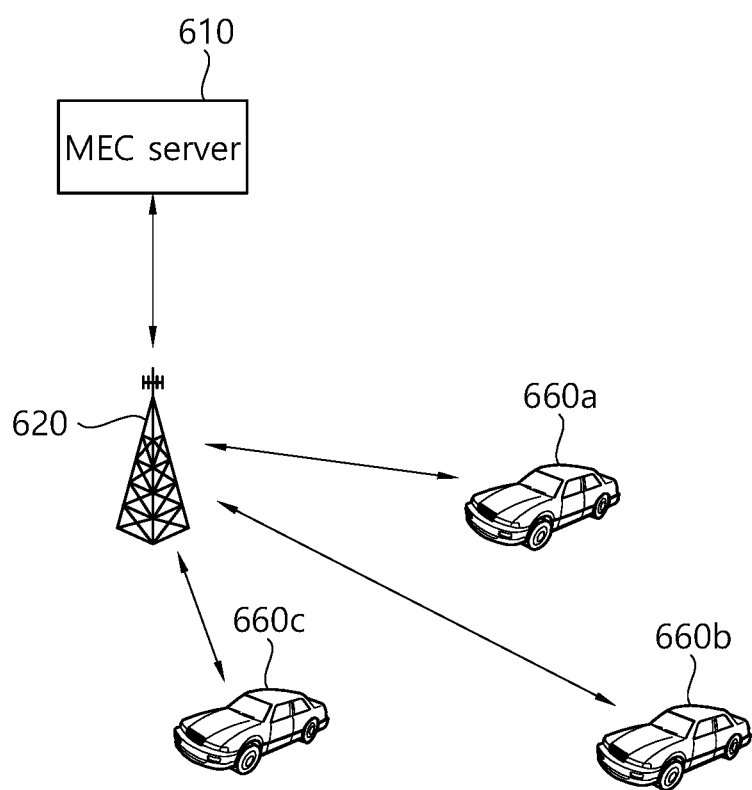
FIG. 7 shows an example in which the MEC server remotely controls the vehicle.

FIG. 7 Shows an Example in which the MEC Server Remotely Controls the Vehicle.

Referring to FIG. 7, an MEC server 610, a base station 620, and vehicles 660a to 660c are shown. The base station 620 may be a gNB or an eNB. The base station 620 may be a base station including both a gNB and an eNB. The MEC server 610 may be connected to the base station 620 through wired communication or wireless communication. The MEC server 610 may transmit data to or receive data from the base station 620. Although the figure shows that the MEC server 610 and the base station 620 are directly connected, this is only an example, and the MEC server 610 may be connected to the base station 620 through another network node. The base station 620 may transmit/receive data to and from a Telematics Communication Unit (TCU) mounted in the vehicles 660a to 660c.

The TCU may obtain status information from devices mounted on the vehicles 660a to 660c, and the status information may include various sensor data, video data, and the like. The TCU may transmit state information (or vehicle-related information including the state information) to the base station 620, and the base station 620 may transmit the state information to the MEC server 610. Then, the MEC server 610 may transmit data for controlling the vehicles 660a to 660c to the base station 620 based on the state information. When the base station 620 transmits data for controlling the vehicles 660a to 660c to the TCU, the TCU may control the vehicles 660a to 660c by transmitting the received data to devices mounted on the vehicles 660a to 660c. Then, the MEC server 610 may transmit map information to the base station 620, and the base station 620 may transmit it to the TCU. The TCU may control the vehicles 660a to 660c using the map information.

A TCU mounted on the MEC server 610 and the vehicles 660a to 660c will be described in detail with reference to FIG. 8.

Figure 8:
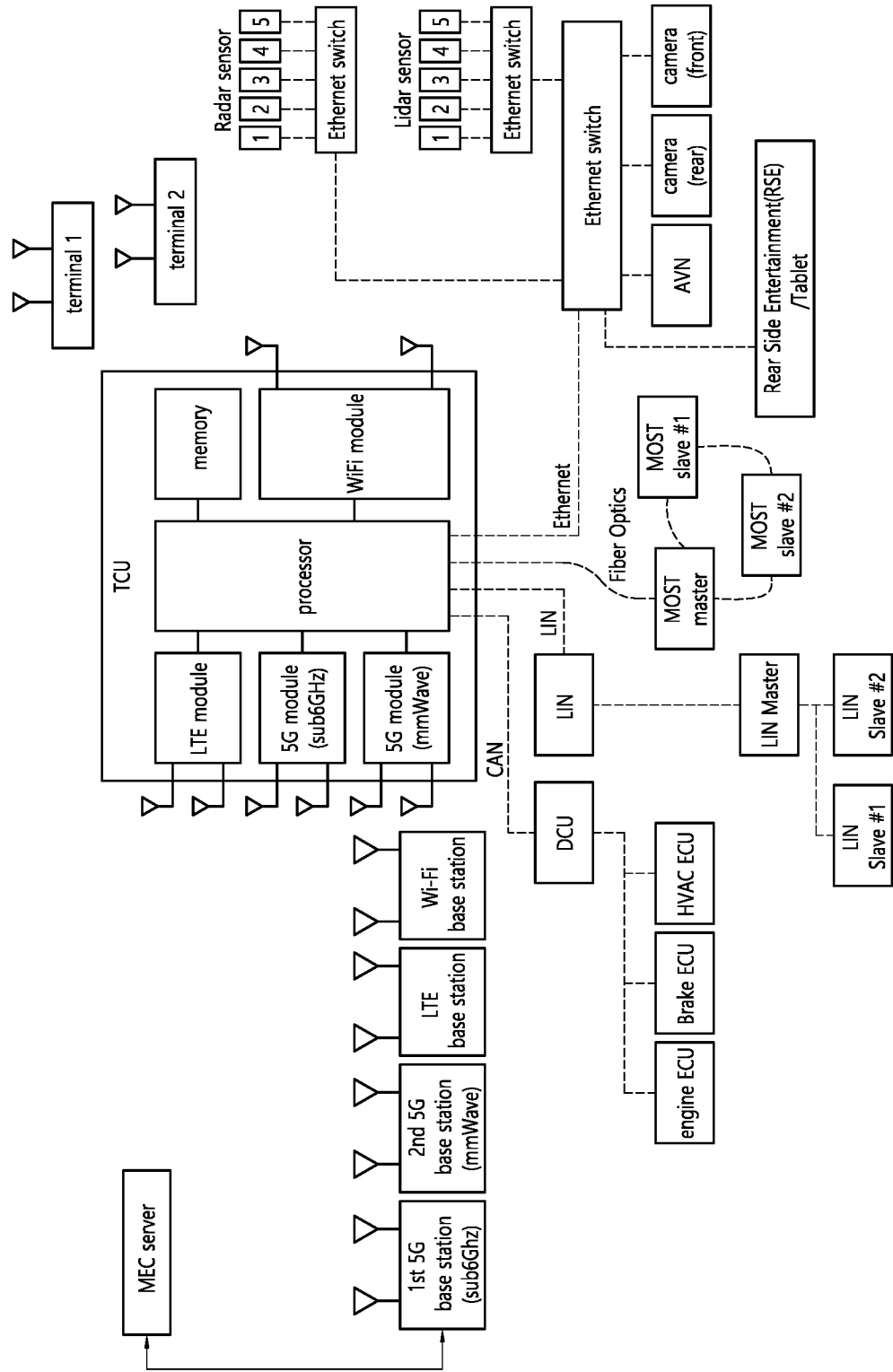
FIG. 8 is a block diagram illustrating an example of an MEC server and an example of a TCU according to the disclosure of the present specification.

FIG. 8 is a Block Diagram Illustrating an Example of an MEC Server and an Example of a TCU According to the Disclosure of the Present Specification.

The MEC server is the MEC server 610 described with reference to FIGS. 6a to 6d and 7, and will be described below by omitting reference numerals. The TCU 100 is a TCU mounted on the vehicles 660a to 660c described with reference to FIG. 7, and will be described below by omitting reference numerals.

The MEC server may be implemented as in the examples described with reference to FIGS. 6a to 6d. Although it is illustrated in FIG. 8 that the MEC server directly communicates with the base stations, this is only an example, and the MEC server may communicate with the base stations through another network node (eg, a UPF node). The MEC server may include a processor (not shown) and a memory (not shown). The memory can store the MEC server app. The processor may perform the operations described in the disclosure of this specification by using the MEC server app stored in the memory. MEC server app is, for example, VR/AR app, camera data analysis app, sensor data analysis app (including lidar sensor data analysis app and radar sensor data analysis app), engine ECU data analysis app, speed ECU data analysis app, HVAC ECU data analysis app, an ECU control app, a control command sending app, a baseball app, a golf app, and the like.

A 5G base station (sub6 GHz) is a base station that performs communication based on the 5G standard in the FR1 (Frequency Range 1) band (frequency band below 7125 MHz). A 5G base station (mmWave) is a base station that performs communication based on the 5G standard in the FR2 (Frequency Range 2) band (frequency band of 24250-52600 MHz). The LTE base station is a base station that performs communication based on the LTE standard. A Wi-Fi base station is a base station that performs communication based on the Wi-Fi standard. The MEC server may communicate with the TCU using at least one of a 5G base station (sub6 GHz), a 5G base station (mmWave), an LTE base station, and a Wi-Fi base station.

The TCU may include an LTE module, a 5G module (sub6 GHz), a 5G module (mmWave), a WiFi module, a processor and a memory. The LTE module is a communication module (ie, a transceiver) that performs communication (transmission/reception of data) based on the LTE standard. The 5G module (sub6 GHz) is a communication module (ie, a transceiver) that performs communication (transmission/reception of data) based on the 5G standard in the FR 1 band. The 5G module (mmWave) is a communication module (ie, transceiver) that performs communication (transmission and reception of data) based on the 5G standard in the FR 2 band. The WiFi module is a communication module (ie, a transceiver) that performs communication (transmission and reception of data) based on the WiFi standard. The LTE module, 5G module (sub6 GHz), 5G module (mmWave) and WiFi module can be connected with the processor through an interface such as PCIe (PCI express). In addition, although the LTE module, 5G module (sub6 GHz), 5G module (mmWave), and WiFi module are each shown as separate objects, but one communication module may perform functions of the LTE module, 5G module (sub6 GHz), 5G module (mmWave) and WiFi module.

The processor of TCU is connected with LTE/5G module (sub6 GHz), LTE/5G module (mmWave), WiFi module and memory. The memory may store MEC client apps. The processor may receive data transmitted by base stations or terminals (terminal 1 and terminal 2) using an LTE module, a 5G module (sub6 GHz), a 5G module (mmWave), and a WiFi module. The processor may transmit data to base stations or terminals (terminal 1 and terminal 2) using an LTE module, a 5G module (sub6 GHz), a 5G module (mmWave), and a WiFi module. Here, the terminals (terminal 1 and terminal 2) may be wireless communication devices used by a user in a vehicle. In addition, the processor of the TCU may perform the operations described in the disclosure of this specification by using the MEC client app stored in the memory.

The processor of the TCU may be connected to devices mounted on the vehicle. For example, the processor may be connected to a Domain Control Unit (DCU), a Local Interconnect Network (LIN) master, a Media Oriented System Transport (MOST) master, and an Ethernet switch. The processor of the TCU may communicate with the DCU using CAN (Controller Area Network) communication technology. The processor of the TCU can communicate with the LIN master using LIN (Local Interconnect Network) communication technology. The processor of the TCU can communicate with the MOST master connected by fiber optics using MOST communication technology. The processor of the TCU can communicate with the Ethernet switch and devices connected to the Ethernet switch using Ethernet communication technology.

The DCU is a device that controls a plurality of ECUs. The DCU can communicate with a plurality of ECUs using CAN communication technology. Here, CAN is a standard communication technology designed for microcontrollers or devices to communicate with each other in a vehicle. CAN is a non-host bus type, message-based network protocol mainly used for communication between controllers.

The DCU may communicate with an ECU such as an engine ECU that controls the engine, a brake ECU that controls brakes, and an HVAC ECU that controls a heating, ventilation, & air conditioning (HVAC) device, etc. The DCU can transmit data received from the processor of the TCU to each ECU. In addition, the DCU can transmit the data received from each ECU to the processor of the TCU.

The LIN master may communicate with LIN slaves (LIN Slave #1 and LIN Slave #2) using LIN communication technology. For example, LIN Slave #1 may be a slave that controls one of a steering wheel, a roof top, a door, a seat, and a small motor. Here, LIN is a serial communication technology for communication between components in an automobile network. The LIN master may receive data from the processor of the TCU and transmit it to the LIN slaves (LIN Slave #1 and LIN Slave #2). In addition, the LIN master may transmit data received from the LIN slaves to the processor of the TCU.

The MOST master may communicate with the MOST slaves (MOST Slave #1 and MOST Slave #2) using MOST communication technology. Here, MOST is a serial communication technology that transmits audio, video, and control information using an optical cable. The MOST master may transmit data received from the processor of the TCU to the MOST slaves. Also, the MOST master can transmit data received from the MOST slaves to the processor of the TCU.

Ethernet is a computer networking technology used in local area networks (LAN), metropolitan area networks (MAN), and wide area networks (WAN). The processor of the TCU can transmit data to each device through an Ethernet switch using Ethernet communication technology. Each device can transmit data to the processor of the TCU through an Ethernet switch using Ethernet communication technology.

Radar (radio detection and ranging) is a technology for measuring the distance, direction, angle, and velocity of a target using radio waves. The radar sensors 1 to 5 are provided in the vehicle to measure the distance, direction, angle, and speed of objects around the vehicle. The radar sensors 1 to 5 may transmit the measured sensor data to the processor of the TCU.

LiDAR (light detection and ranging) is a sensing technology that uses a light source and a receiver to detect a remote object and measure a distance. Specifically, lidar is a technology that measures the distance, intensity, speed, etc. to the target by illuminating the target with pulsed laser light and measuring the pulse reflected by the sensor. The lidar sensors 1 to 5 measure the distance to the target, speed, and the like. The lidar sensors 1 to 5 may transmit the measured sensor data to the processor of the TCU.

For reference, although radar sensors and lidar sensors are illustrated in FIG. 8 as using Ethernet communication technology, the radar sensors and lidar sensors may also use CAN communication technology.

AVN (Audio, Video, Navigation) is a device provided in a vehicle to provide sound, video, and navigation. AVN may receive data from the processor of the TCU using Ethernet communication technology, and provide sound, image, and navigation based on the received data. AVN can transmit data to the processor of the TCU using Ethernet communication technology.

The camera (front) and the camera (rear) can capture images from the front and rear of the vehicle. Although it is illustrated in FIG. 8 that there is one camera in the front and one in the rear, this is only an example, and cameras may be provided on the left and right sides. In addition, a plurality of cameras may be provided in each of the front and rear. The cameras may transmit camera data to, and receive data from, the processor of the TCU using Ethernet communication technology.

Rear Side Entertainment (RSE) means rear seat entertainment. RSE is a device installed behind the passenger seat or behind the driver's seat of a vehicle to provide entertainment to the occupants. A tablet may also be provided inside the vehicle. The RSE or tablet may receive data from the processor of the TCU and transmit the data to the processor of the TCU using Ethernet communication technology.

In the conventional cloud server-based network structure (eg, base station-wired network-cloud server), it takes about 30-40 msec for that data is transmitted from the base station to the cloud server, the cloud server analyzes the data to transmit the data to the base station, and the base station receives it.

Specifically, a person remotely controls a vehicle through a conventional cloud server (Remote Driving Control), or a conventional cloud server analyzes data of the vehicle's front camera/rear camera/various sensors and mounted on the vehicle's ECU, etc, and the conventional cloud server can remotely control devices. At this time, if the device mounted on the vehicle or the user's terminal is using a high-capacity real-time data service (multimedia data such as VR/AR, 8K video streaming, etc.), the possibility of an accident may increase because the operation (brake/speed/direction control, etc.) to control the vehicle by transmitting the remote control data to the devices mounted on the vehicle within 5 msec cannot be performed.

The MEC server according to the disclosure of the present specification can perform a function of receiving/storing/transmitting/analyzing various data such as video (camera)/audio/sensor data performed in a conventional cloud server, and a function of managing the TCU and devices mounted on the vehicle.

In the MEC server according to the disclosure of the present specification, there may be an MEC server application (MEC server app) for performing operations according to various purposes. The MEC server may perform the operations described in the disclosure of this specification by using the MEC server application.

In addition, in the TCU according to the disclosure of the present specification, there may be an MEC client application (MEC client app) for performing operations according to various purposes. The TCU may use the MEC client application to perform the operations described in the disclosure of this specification.

The operations of the MEC server, the mobile communication network, and the TCU to be described in the disclosure of the present specification are briefly described below. However, the following description is merely an example, and operations of the MEC server, the mobile communication network, and the TCU will be described in detail with reference to FIGS. 9 to 16.

The MEC server monitors the operation of the TCU and ECU in the vehicle to comply with regulations such as the Road Traffic Act, ISO26262 (Standard related to industrial safety, Road vehicles—Functional safety) or SAE (System Architecture Evolution) standards. If the operation of the TCU and the ECU in the vehicle violates regulations, the MEC server controls the operation of the ECU in the vehicle based on a predefined scenario.

The MEC server may analyzes vehicle-related information (eg, the status information of devices installed in the vehicle such as engine ECU-related data, RPM (revolutions per minute) ECU-related data, wheel-related data, brake-related data, HVAC (heating, ventilation & air conditioning) related data, etc) received from the TCU in the vehicle, and controls the operation of devices in the vehicle connected to the TCU based on a predefined operation scenario.

When the MEC server transmits control data for a plurality of target devices in the vehicle at once, the TCU may transmit data frames, which is based on a plurality of communication technologies (CAN/LIN/Flexray/MOST/Ethernet), by combining the data frames in one message. in order to efficiently transmit control data to the plurality of target devices. The TCU may transmit a data frame based on each communication technology to a target device in the vehicle (eg, a controller/master such as ECU, a LIN master). The TCU transmits the execution result of the control data provided from the MEC server to the MEC server, and the MEC server can determine the failure/success of the control data transmission (FAIL/SUCCESS).

If the result of the target device (the device that will receive the data sent by the MEC server) executing the control data (sent by the MEC server) is FAIL or there is a delay in the target device, the MEC server may retransmit the same control data for a predetermined number of times (eg, 10). In this case, the MEC server may retransmit the control data using the beam having the highest data rate.

To secure safety, the MEC server may retransmit the same control command by selecting at least one beam of the beams with the highest data rate among the beams of the 5G_sub6 Ghz base station, the beam with the highest data rate among the beams of the 5G_mmWave base station, and the beam with the highest data rate among the beams of the LTE base station.

The MEC server may monitor the operating state of the TCU and determine the current state of the TCU. For example, the MEC server may monitor the operation state of the TCU, and determine the current state of the TUC as one of inactive, active, sleeping, and moving.

The MEC server may receive vehicle-related information (eg, vehicle location-related information) from the TCU and manage the vehicle location (eg, collect/analyze/control/record).

The MEC server may receive vehicle-related information (eg, vehicle speed-related information) from the TCU and manage (eg, collect/analyze/control/record) vehicle speed-related information. The MEC server manages information related to the speed of the vehicle to determine whether the vehicle is overspeeding, whether the vehicle complies with a safe speed, and the like.

The MEC server may receive vehicle-related information (eg, engine ECU information) from the TCU and manage (eg, collect/analyze/control/record) engine ECU (Engine controlling ECU) information.

The MEC server receives vehicle-related information (eg, information received from sensors and cameras mounted on the vehicle) from the TCU and manages (eg. collected/analyzed/controlled/recorded) information of vehicle sensor and camera (Lidar, Radar, and front/rear/measurement/cabin cameras).

As a result of analyzing vehicle sensor and camera information, if a vehicle collision with pedestrians, obstacles, etc is expected, the MEC server controls the ECU (engine ECU, brake ECU, etc.) in the vehicle by transmitting control data to the TCU based on the emergency response scenario.

In order to distinguish control data (data based on ECU, MOST, LIN, FlexRay, etc.) and general data used for multimedia services (high-capacity real-time data such as AR/VR/video/audio) transmitted to devices (ECU, etc.) mounted on the vehicle, the MEC server may transmit a message including a tag for each type of data, which to be transmitted to the TCU, to the TCU.

After checking the tag of the data included in the message received from the MEC server, the TCU may first store the control data used for vehicle control in the buffer of the memory. In addition, the TCU may transmit control data from a memory to a device such as an ECU controller, and thereafter, high-capacity real-time data (ie, general data) may be transmitted after transmitting the control data.

When there is a large number of control data received from the MEC server, the TCU may transmit the control data of the highest priority to the device mounted on the vehicle according to the priority of the tag of the control data.

The MEC server may transmit general data to the TCU so that a timeout does not occur for each service of general data in consideration of requirements (delay time, etc.) of general data.

In addition, in consideration of the general data requirements (delay time, etc.), the TCU can also transmit the general data received from the MEC server to the devices mounted on the vehicle so that a timeout does not occur for each service of general data.

For reference, in the present specification, control data refers to data including commands for controlling an autonomous driving-related device and a device controlling vehicle among devices mounted on a vehicle. The control data may include, for example, data based on communication technologies such as CAN, LIN, Flexray, and MOST, and data related to terrain used for autonomous driving, such as HD-MAP.

In the present specification, general data means data to be transmitted to a device not directly related to autonomous driving among devices mounted on a vehicle and to a terminal of a user riding in the vehicle. General data includes data related to multimedia services (AR/VR/video/audio) and other high-capacity real-time data.

As described in the background section, there is no existing method by which data transmission/reception between the MEC server and the TCU mounted on the vehicle can be performed quickly and efficiently.

For example, the TCU receives camera data and sensor data from at least one camera and sensor (eg, lidar sensor, radar sensor, etc.) mounted on the vehicle, and transmits the received camera data and received sensor data to the MEC server. The MEC server may perform object detection on camera data and sensor data by using an autonomous driving algorithm such as a deep learning algorithm. In addition, the MEC server may generate control data for controlling the driving of the vehicle (including control commands for controlling the speed and direction of the vehicle) based on the object detection result. In this case, in order to increase the accuracy of object detection, automobile manufacturers are requesting that the TCU transmit camera data and sensor data in high resolution like raw data.

For example, a vehicle may be equipped with a plurality of autonomous driving cameras. For example, the vehicle may be equipped with 4 front cameras, 4 rear cameras, 2 side (left) cameras, 2 side (right) cameras, and 1 inside camera (eg, a cabin camera). In this way, when a total of 13 cameras are installed in a vehicle, when all cameras transmit raw data, an uplink speed of 19.37-37.57 Gbits/sec should be secured at least.

In addition, when sensor data of a lidar sensor or a radar sensor mounted on a vehicle is transmitted as raw data, the data rate of the sensor data may be 10 Gbits/sec or more. Sensor data used in the following description is a term including at least one of sensor data of a lidar sensor and sensor data of a radar sensor.

However, there has not been a method in which the TCU transmits camera data or sensor data in high resolution in consideration of the importance of the camera and sensor mounted on the vehicle, the channel state between the TCU and the base station, or the driving state of the vehicle.

Specifically, in order for the MEC server to recognize an object using a deep learning algorithm, camera data (eg, RGB data) captured with a high-resolution camera is required. For example, a camera mounted on a vehicle must support uncompressed camera data at a data rate of 1.49 Gbits/sec to 2.89 Gbits/sec.

The disclosure of the present specification proposes a method for solving the above-described problems.

For example, the TCU can utilize all of the LTE module, 5G module (sub 6 GHz), 5G module (mmWave) and WiFi module to increase the uplink transmission rate to over 20 Gbps.

In addition, the TCU may transmit camera data of at least one camera and sensor data of at least one sensor to the MEC server. For example, camera data and sensor data may be transmitted to a camera data analysis app and a sensor data analysis app (including a lidar sensor data analysis app and a radar sensor data analysis app) stored in the memory of the MEC server. Then, the MEC server may detect objects in the sensor data and the camera data by inputting the camera data and the sensor data to the deep learning engine using each of the camera data analysis app and the sensor data analysis app. In addition, the MEC server may use the MEC sensor fusion app to generate control data for controlling the driving of a vehicle based on objects detected from the camera data and the sensor data, and transmit the control data to the TCU. At this time, the MEC server may transmit control data to the TCU through the MEC network management app stored in the memory.

Here, the MEC server may extract an object from sensor data and camera data using the MEC sensor fusion app, and recognize the location of the extracted object. For example, the MEC server may use the MEC sensor fusion app to extract features from sensor data for a front (or rear, lateral) object measured by a lidar sensor mounted on a vehicle to determine the location of the object. In addition, the MEC server may convert the location of the object into coordinates on the global HD-MAP using the MEC sensor fusion app. Then, the MEC server uses the MEC sensor fusion app to extract the features of the object from the camera data of the camera mounted on the vehicle, and then inputs the feature values extracted from the sensor data and the image feature values extracted from the camera data in artificial intelligence (eg, DNN (Deconvolutional Neural Network)) learner to classify/recognize object types (eg, passenger cars, trucks, pedestrians, motorcycles, etc.). That is, the MEC server can use the MEC sensor fusion app to recognize objects and global positions of objects based on lidar sensor data and camera data. TCU may control a target device (eg, target ECU) based on control data transmitted by the MEC server and transmit the operation result to the MEC server. The MEC server may transmit the operation result to the MEC network management app.

The TCU may rapidly transmit camera data and sensor data to the MEC server in consideration of the priority of at least one camera and at least one sensor mounted on the vehicle. Accordingly, the MEC server may efficiently detect an object using the received camera data and sensor data and control the vehicle.

Hereinafter, operations of the MEC server, the TCU, and the mobile communication network (including the base station) according to the disclosure of the present specification will be described in detail with reference to FIGS. 9 to 16. Hereinafter, a case in which one TCU exists will be described, but this is only an example, and operations described in the present disclosure may be applied even when a plurality of TCUs exist.

Figure 9:
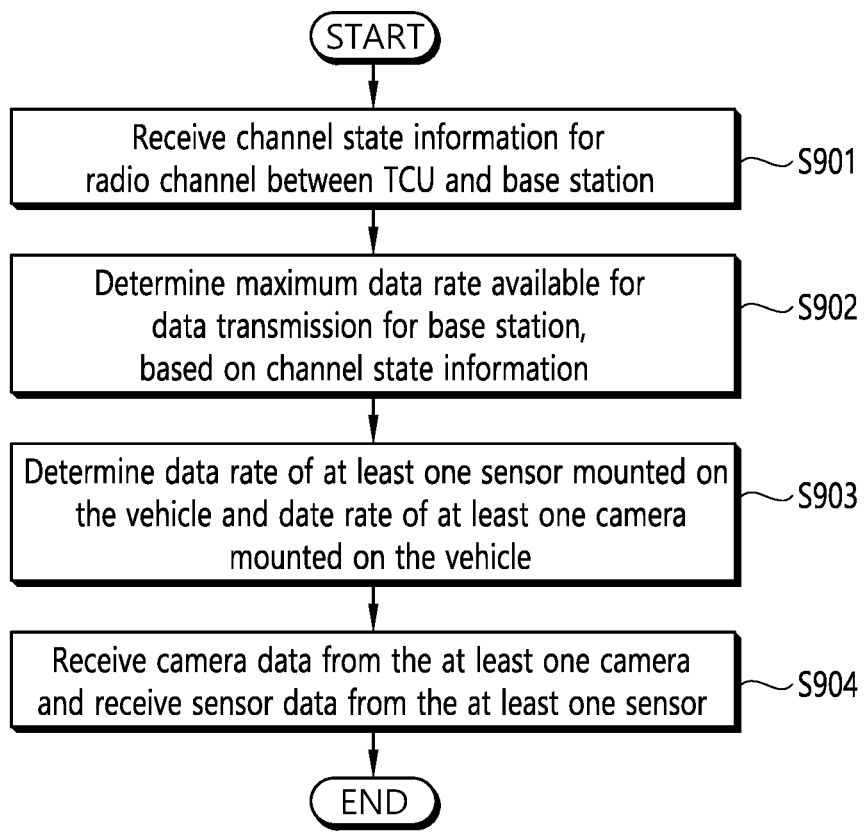
FIG. 9 shows an example of operation of a TCU according to the disclosure of the present specification.

FIG. 9 Shows an Example of Operation of a TCU According to the Disclosure of the Present Specification.

Referring to FIG. 9, in step S901, the TCU may receive channel state information for a radio channel between the TCU and the base station from the base station. For reference, the TCU may transmit a pilot signal to the base station before performing step S901. The channel state information may be generated by the MEC server based on the pilot signal transmitted by the TCU.

In step S902, the TCU may determine a maximum data rate available for data transmission to the base station based on the channel state information.

In step S903, the TCU may determine a data rate of at least one camera mounted on the vehicle and a data rate of at least one sensor mounted on the vehicle. Here, the TCU may determine the data rate of the at least one camera and the data rate of the at least one sensor based on at least one of a priority and a maximum data rate for the at least one camera and the at least one sensor. The at least one sensor may include at least one radar sensor and at least one lidar sensor. Priorities for at least one camera and at least one sensor may be preset. Alternatively, the TCU may set priorities for at least one camera and at least one sensor based on the driving speed of the vehicle. For example, when the vehicle travels at a low speed below a certain speed (eg, 30 km/h), the TCU may set a low priority for a long-range sensor among at least one sensor and set a high priority for a short-range sensor. When the vehicle drives at a high speed over a certain speed (eg, 30 km/h), the TCU may set a priority of a long-distance sensor among at least one sensor to be higher than that in the case of low-speed driving.

The TCU may transmit information about the data rate of at least one camera and the data rate of at least one sensor to the base station. In addition, the TCU may receive information about the data rate allocated to the TCU by the MEC server from the base station. Here, the information on the data rate allocated to the TCU by the MEC server may include information on the transmission beam allocated to the TCU (that is, including at least one information among information on the transmission beam used when the TCU performs uplink communication to the base station or information on the receive beam used when the TCU performs downlink communication with the base station) and information on a data rate of each transmission beam allocated to the TCU. The TCU may adjust the data rate of the at least one camera and the data rate of the at least one sensor based on the priority of the at least one camera and the at least one sensor and the information on the data rate allocated to the TCU.

In step S904, the TCU may receive camera data from at least one camera and receive sensor data from at least one sensor. At this time, the TCU may receive camera data from at least one camera and sensor data from at least one sensor based on the data rate of the at least one camera and the data rate of the at least one sensor determined in step S903.

After step S904, the TCU may transmit camera data and sensor data to the base station. Then, the mobile communication network including the base station may transmit camera data and sensor data to the MEC server.

Figure 10:
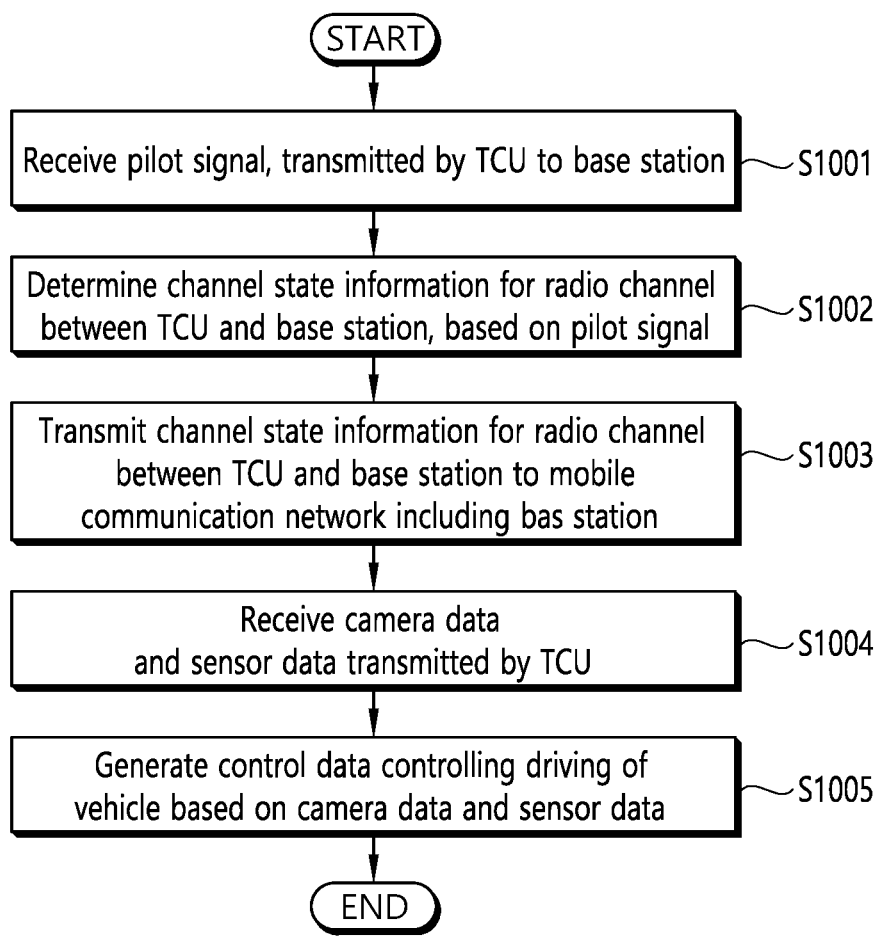
FIG. 10 shows an example of the operation of the MEC server according to the disclosure of the present specification.

FIG. 10 Shows an Example of the Operation of the MEC Server According to the Disclosure of the Present Specification.

Referring to FIG. 10, in step S1001, the MEC server may receive a pilot signal transmitted by the TCU to the base station. Specifically, the MEC server may receive a pilot signal transmitted by the TCU to the base station from a mobile communication network including the base station.

In step S1002, the MEC server may determine the state information for the radio channel between the TCU and the base station based on the pilot signal.

In step S1003, the MEC server may transmit state information on a radio channel between the TCU and the base station to a mobile communication network including the base station.

The MEC server may receive information on a data rate of at least one camera mounted on the vehicle and a data rate of at least one sensor mounted on the vehicle. The MEC server may allocate a data rate to the TCU based on a sum of the data rate of the at least one camera and the data rate of the at least one sensor. For example, the MEC server may allocate a data rate to the TCU by performing the operations of examples S1401 to S1405 to be described later. In addition, the MEC server may transmit information on the data rate allocated to the TCU to the TCU through a mobile communication network including the base station.

In step S1004, the MEC server may receive the camera data and sensor data transmitted by the TCU. The MEC server may receive camera data and sensor data from a mobile communication network including a base station.

In step S1005, the MEC server may generate control data for controlling the driving of the vehicle based on the camera data and the sensor data.

The MEC server may transmit the generated control data to a mobile communication network including a base station. Then, the base station receiving the control data may transmit the control data to the TCU.

Hereinafter, specific examples of the operation of the TCU and the operation of the MEC server described in FIGS. 9 and 10 will be described with reference to FIGS. 11 to 14.

FIG. 11 is a Signal Flow Diagram Illustrating an Example of the Operation of the TCU, the MEC Server, and the Mobile Communication Network According to the Disclosure of the Present Specification.

Referring to FIG. 11, in step S1101, the TCU may transmit a pilot signal to the base station. Then, the mobile communication network including the base station may transmit the pilot signal transmitted by the TCU to the MEC server. Specifically, in order to determine the state of the uplink channel, the TCU may broadcast a pilot signal to the channel used by the base station using the MEC client app.

Before step S1101, the MEC server broadcasts a message requesting transmission of a pilot signal to determine the status of uplink channels of all TCUs connected to the MEC server at a specific time (eg, t1). Then, in step S1101, the TCU may broadcast the pilot signal at an arbitrary time t2 existing within the random time interval (slot) T1 range.

In step S1102, the MEC server may determine channel state information for a radio channel between the TCU and the base station based on the pilot signal. For example, the channel state may be a Channel Quality Indicator (CQI).

In step S1103, the MEC server may transmit channel state information to the mobile communication network. Then, the base station included in the mobile communication network may transmit the channel state information to the TCU.

In step S1104, the TCU may determine a maximum data rate available for data transmission to the base station based on the channel state information. Specifically, the TCU may determine a radio channel state between the TCU and the base station based on the channel state information, and determine a data rate for each beam of a plurality of transceivers of the TCU based on the channel state information.

For example, the TCU may determine a data rate group for each beam of a plurality of transceivers as shown in the table below.

TABLE 1

$R(t) = \{ R_{i,1,1}(t), R_{i,1,2}(t), R_{i,j,k}R(t), \ldots, R_{i,i,U}(t),$
$R_{i,2,1}(t), R_{i,2,2}(t), R_{i,j,k}R(t), \ldots, R_{i,2,X}(t),$
$R_{i,3,1}(t), R_{i,3,2}(t), R_{i,j,k}R(t), \ldots, R_{i,3,Y}(t),$
$R_{i,4,1}(t), R_{i,4,2}(t), R_{i,j,k}R(t), \ldots, R_{i,4,Z}(t)\}$ t may be a time point at which the TCU determines the data rate. Here, i may be an index indicating the TCU, j may be an index indicating the type of transceiver, and k may be an index indicating the order of antennas in each transceiver.

For example, the example of j is as follows.
j=1: 5G transceiver (mmWave)
j=2: 5G transceiver (sub6 Ghz)
j=3: LTE transceiver
j=4: WiFi transceiver k may exist for each transceiver as much as the maximum number of beams of the corresponding transceiver. For example, when the maximum number of beams of the 5G transceiver (mmWave) is U, when j=1, k may k=1~U. When the maximum number of beams of the 5G transceiver (sub6 Ghz) is X, when j=2, k may be k=1 to X. When the maximum number of beams of the LTE transceiver is Y, when j=3, k may be k=1 to Y. When the maximum number of beams of the WiFi transceiver is Z, when j=4, k may be k=1 to Z.

In step S1105, the TCU may determine a data rate of at least one camera mounted on the vehicle and a data rate of at least one sensor mounted on the vehicle.

In step S1106, the TCU may receive camera data from at least one camera mounted on the vehicle, and may receive sensor data from at least one sensor mounted on the vehicle.

In step S1107, the TCU may transmit camera data and sensor data to the base station. Then, the mobile communication network including the base station may transmit camera data and sensor data to the MEC server.

The TCU may receive information about the data rate allocated to the TCU from the MEC server. Here, the information on the data rate allocated to the TCU may include information on the transmission beam allocated to the TCU and information on the data rate of each transmission beam allocated to the TCU. The TCU may transmit camera data and sensor data using a transmission beam allocated to the TCU.

The TCU combines at least one beam of the 5G transceiver (mmWave), at least one beam of the 5G transceiver (sub6 Ghz), at least one beam of the LTE transceiver, and at least one beam of the WiFi transceiver to transmit camera data and sensor data to the base station.

For reference, at this time, the MEC server transmits a request message to the TCU to control the upload speed of the data stream of camera data and sensor data (sensor data of the lidar sensor, sensor data of the radar sensor) based on the reception buffer size of the MEC server.

In step S1108, the MEC server may generate control data for controlling the driving of the vehicle based on the camera data and the sensor data.

Specifically, the MEC server may transmit the received sensor data and camera data to the camera data analysis app, the lidar sensor data analysis app, and the radar sensor data analysis app stored in the memory of the MEC server.

Then, the camera data analysis app can extract the object information from the camera data by inputting the camera data of each camera into the deep learning analysis engine. In addition, the MEC server lidar/radar sensor data analysis app may input the sensor data of each sensor into the deep learning analysis engine to extract object information from the sensor data.

The MEC server may input object information extracted from camera data and object information extracted from sensor data into the MEC sensor fusion app, and the MEC server may generate control data for controlling the vehicle using the MEC sensor fusion app. The control data may include, for example, a command for preventing a vehicle collision or a command for controlling the speed of the vehicle, etc. The MEC server may transmit the control data to the TCU by selecting at least one transmission beam in the order of the highest transmission rate among at least one transmit beam of a first 5G base station (sub6 Ghz) connected to the MEC server, at least one transmit beam of a second 5G base station (mmWave), at least one transmit beam of an LTE base station, and at least one transmit beam of a WiFi base station.

In step S1109, the MEC server may transmit control data to the mobile communication network. Then, the base station included in the mobile communication network may transmit the control data to the TCU.

In step S1110, the TCU may transmit control data to at least one device mounted on the vehicle.

The TCU may generate a CAN frame based on the control data, and may describe an arbitration value in each CAN frame according to a priority value included in the control data. And, the TCU may describe the Control Bit corresponding to the control operation in the control data in the CAN frame. The TCU can transmit the CAN frame to the target device (eg engine ECU, brake ECU, HVAC ECU, RPM ECU, etc.).

After the target device receives the CAN frame, when the target device completes an operation according to the CAN frame, the target device may transmit an ACK to the CAN controller (eg, DCU). Then, the CAN controller transmits an ACK to the TCU, and the TCU may transmit to the MEC server a message (SUCCESS) indicating that the operation of the target device according to the control data has been successfully performed to the MEC server.

Figure 12A:
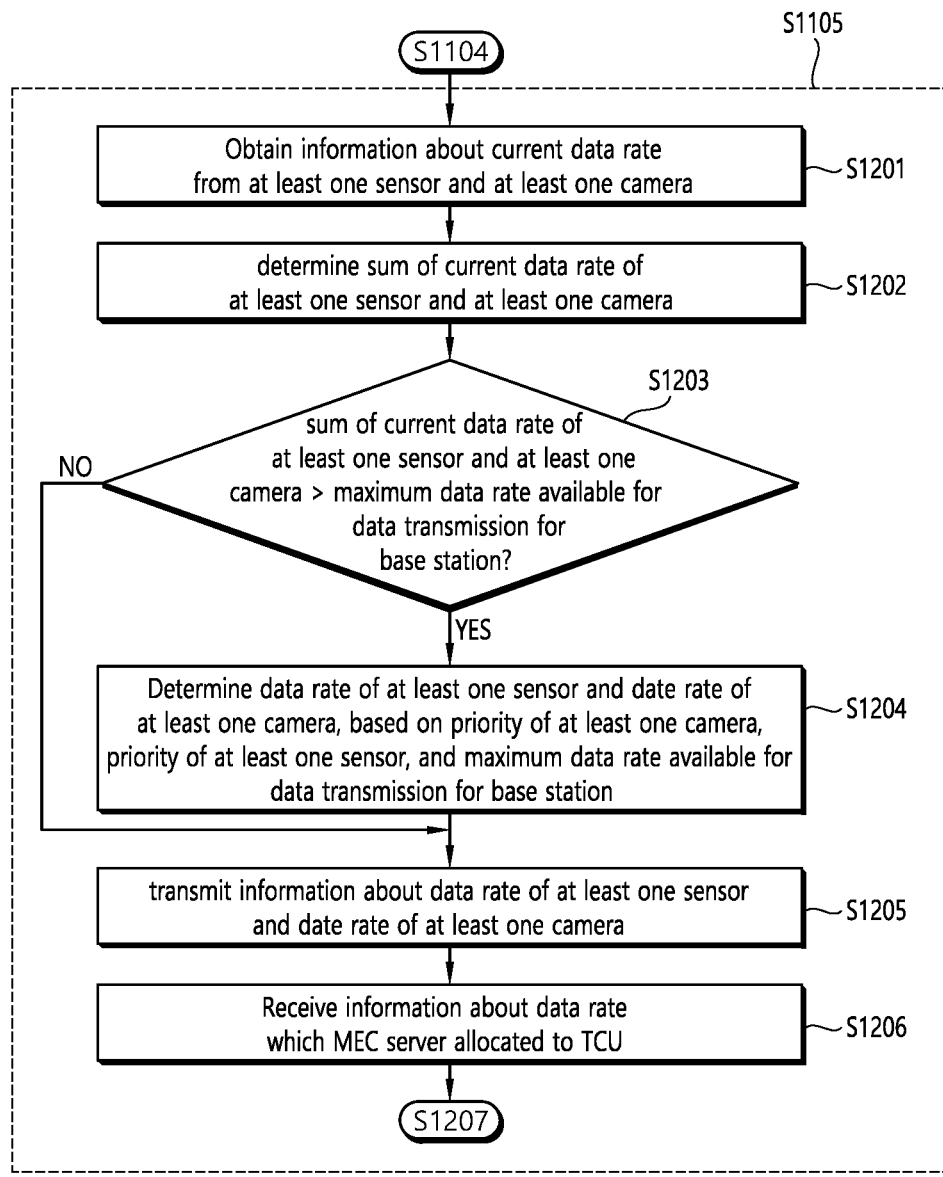
FIGS. 12a and 12b are flowcharts illustrating an example of S1105 of FIG. 11.
Figure 12B:
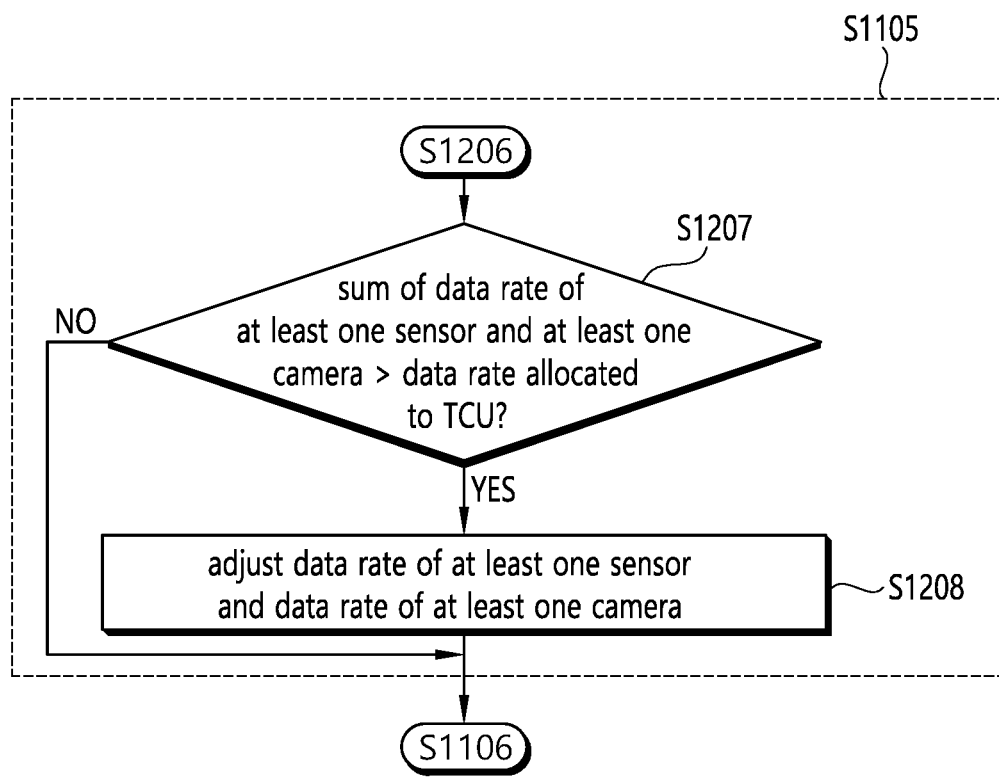

FIGS. 12a and 12b are Flowcharts Illustrating an Example of S1105 of FIG. 11.

FIGS. 12a and 12b show an example of S1105 of FIG. 11. In step S1201, the TCU may obtain information on the current data rate from at least one camera and at least one sensor mounted on the vehicle. The current data rate may mean a data rate used by each of the at least one camera and the at least one sensor for transmitting camera data or sensor data at a time when the TCU acquires information from the at least one camera and the at least one sensor. The TCU may also acquire information on a maximum data rate supportable by at least one camera and a maximum data rate supportable by at least one sensor.

In addition, the TCU may request a table related to the data rate of each of lidar sensor, the radar sensor, and the camera from the camera controller that controls the camera mounted on the vehicle from lidar sensor controller that controls the vehicle-mounted lidar sensor, the radar sensor controller that controls the vehicle-mounted radar sensor, and the camera controller that controls the vehicle-mounted camera. For example, the TCU may request and obtain a table such as the example of FIG. 13a from the lidar sensor controller, the radar sensor controller, and the camera controller. The table related to the data rate of the lidar sensor, the radar sensor, and the camera may include information about the maximum data rate of each of the lidar sensor, the radar sensor, and the camera, and information about the data according to the category corresponding to the sampling rate supported by each of the lidar sensor, the radar sensor, and the camera. The table related to the data rate of the lidar sensor, the radar sensor and the camera may include values of the ability of the TCU to lower the data rate when it needs to lower the data rate of the lidar sensor, the radar sensor and the camera.

In step S1202, the TCU may determine the sum of the current data rates of the at least one camera and the at least one sensor. For example, the TCU may determine the sum of the current data rates of the at least one camera and the at least one sensor based on the equation below.

$$Ti(t) = \sum_{l=1}^{l=l\_max} Li,1(t) + \sum_{m=1}^{m=m\_max} Rdi,m(t) + \sum_{n=1}^{n=n\_max} Ci,n(t)$$ [Equation 1]

Here, $L_{i,1}(t)$ is the current (time t) data rate of the 1-th LiDAR sensor connected to TCU-i (the TCU whose index is i). 1_max means the number of lidar sensors installed in the vehicle. Rdi,m(t) is the current data rate of the m-th radar sensor connected to the TCU-i. m_max means the number of radar sensors installed in the vehicle. $C_{i,n}(t)$ is the current data rate of the nth camera connected to TCU-i. n_max means the number of cameras mounted on the vehicle. $T_i(t)$ is the sum of the current data rates of all sensors and cameras connected to the TCU.

In step S1203, the TCU may determine whether a sum of the current data rates of the at least one camera and the at least one sensor is greater than a maximum data rate available for data transmission to the base station. For example, the TCU may determine whether the following equation is satisfied.

$$T_i(t) > SUM(R(t))$$ [Equation 2]

Here, $T_i(t)$ is $T_i(t)$ of Equation 1. SUM(R(t)) means the sum of all elements of R(t) in Table 1.

When Equation 2 is satisfied, the TCU may perform step S1204. When Equation 2 is not satisfied (ie, $T_i(t)$ is equal to or less than SUM(R(t))), the TCU may perform step S1205.

In step S1204, the TCU may determine the data rate of the at least one camera and the data rate of the at least one sensor based on the priority of the at least one camera, the priority of the at least one sensor and the maximum data rate available for data transmission to the base station.

Step S1204 will be described in detail with reference to the example of FIG. 13a.

FIG. 13a is an Example of a Table Showing Data Rates According to Priorities, Categories, and Categories of Cameras and Sensors Mounted on a Vehicle.

FIG. 13a is an example of a table related to data rates of the lidar sensor, the radar sensor, and the camera described in step S1201. Although 3 cameras, 2 lidar sensors, and 2 radar sensors are shown in the drawing, this is only an example, and the number of cameras, lidar sensors, and radar sensors may be different from the examples shown in the drawings.

The figure shows priorities from 1 to 7. In FIG. 13a, the priorities are set from 1 to 7 for entire of the camera, the lidar sensor, and the radar sensor, but this is only an example, and separate priorities may be set for each device. For example, priorities 1 to 3 may be set for cameras 1 to 3, and priorities 1 to 2 may be set for lidar sensors 1 to 2, respectively.

The figure shows a category for each device. Here, the category may correspond to a sampling rate that can be set by each device. For example, category 4 may correspond to a maximum sampling rate supported by a corresponding device, and category 1 may correspond to a minimum sampling rate supported by a corresponding device. Although only four categories are shown in the drawing, this is only an example, and the number of categories may be less than four or more than four. Also, the number of categories may be different for each device.

Priorities for at least one camera and at least one sensor may be preset. Alternatively, the TCU may set priorities for at least one camera and at least one sensor based on the driving speed of the vehicle.

For example, lidar sensor 1 may be a short-range lidar sensor mounted on the front of the vehicle, and lidar sensor 2 may be a long-range lidar sensor mounted on the front of the vehicle. If the vehicle is driving at a low speed below a certain speed (eg 30 km/h), the sensor data of the long-distance sensor may become less important, so the TCU may set the priority of the long-range sensor (eg lidar sensor 2) as low priority (set to 7), and the TCU may set the priority of the short-range sensor (eg, lidar sensor 1) as high priority (set to 1). If the vehicle is driving at high speed over a certain speed (eg 30 km/h), the TCU may set the priority of the long-distance sensor (eg lidar sensor 2) higher (set to 3) than in the case of low speed driving.

According to the example of FIG. 13a, in the case of camera 2, when data is transmitted at the maximum sampling rate (category 4), the data rate may be 2.89 Gbps, and when data is transmitted at the sampling rate of category 3, the data rate may be 1.49 Gbps, when data is transmitted at the sampling rate of category 2, the data rate may be 100 Mbps, and when data is transmitted at the sampling rate of category 1, the data rate may be 10 Mbps.

The TCU may determine the data rate of the camera, lidar sensor, and radar sensor based on the priority of the camera, lidar sensor, and radar sensor and the maximum data rate available for data transmission to the base station.

For example, the TCU may determine a plurality of category combinations of each device in the order of priority so that a category of a device having a high priority is set to be higher than a category of a device having a low priority. Then, the TCU may calculate the sum of data rates according to the category combination of each device, and determine whether the calculated sum is less than or equal to the maximum data rate available for data transmission to the base station. And, the TCU may determine the data rate of the at least one camera and the data rate of the at least one sensor based on the category combination of each device that is less than or equal to the maximum data rate available.

Specifically, when the available maximum data rate is 9 Gbps, the TCU may determine a category for each priority as shown in FIG. 13a. Referring to FIG. 13a, it can be seen that a category of a device having a high priority is higher than a category of a device having a low priority. The sum of the data rates of the category combination according to the example of FIG. 13a is 5 Gbps+1 Gbps+1.49 Gbps+100 Mbps+1 Gbps+10 Mbps+1 Mbps=8.601 Gbps, so the sum of the data rates is less than the maximum available data rate of 9 Gbps.

Alternatively, a combination of categories for each priority of a camera and a sensor may be predetermined and stored in the TCU according to a value of the available maximum data rate. For example, a category combination of each device according to each priority is predetermined according to the interval of the value of the maximum data rate and stored in the TCU, and when the TCU determines the value of the maximum data rate, the TCU may select and use the category combination corresponding to the value of the determined maximum data rate. For example, when the maximum available data rate is 35.88 Gbps or higher, the TCU may use a combination in which category 4 is selected for all devices of FIG. 13a from among the combinations of stored categories.

Referring back to FIGS. 12a and 12b, in step S1205, the TCU may transmit information on a data rate of at least one camera and a data rate of at least one sensor. Here, the information on the data rate of the at least one camera and the data rate of the at least one sensor may include the sum of the data rates(eg, expressed as sum of data rates $r_i(t)$ to be uploaded by TCU) of the at least one camera and the at least one sensor. Here, the sum of the data rates of the at least one camera and the at least one sensor is i) the sum of the data rates determined according to the step S1204 when the step S1204 is performed, and is ii) the sum of the data rates determined according to step S1202, when the step S1204 is not performed.

For reference, before step S1205 is performed, the TCU may receive a message requesting information about the data rate of at least one camera and the data rate of at least one sensor from the MEC server. Then, upon receiving the request message, the TCU may perform step S1205.

In step S1206, the TCU may receive information about the data rate allocated to the TCU by the MEC server. When the MEC server transmits information on the data rate allocated to the TCU to the mobile communication network, the base station may transmit information on the data rate allocated to the TCU to the TCU. Here, the information on the data rate allocated to the TCU by the MEC server may include information on the transmission beam allocated to the TCU (that is, including at least one information between information on the transmission beam used when the TCU performs uplink communication to the base station or information on the reception beam used when the TCU performs downlink communication with the base station) and information on a data rate of each transmission beam allocated to the TCU.

In step S1207, the TCU may determine whether the sum of the data rates of the at least one camera and the at least one sensor is greater than the data rate allocated to the TCU. Here, the sum of the data rates of the at least one camera and the at least one sensor is i) the sum of the data rates determined according to the step S1204 when the step S1204 is performed, and is ii) the sum of the data rates determined according to step S1202, when the step S1204 is not performed.

If the sum of the data rates of the at least one camera and the at least one sensor is greater than the data rate allocated to the TCU, the TCU may perform step S1208. When the sum of the data rates of the at least one camera and the at least one sensor is equal to or less than the data rate allocated to the TCU, the TCU may perform step S1106.

In step S1208, the TCU may adjust the data rate of the at least one camera and the data rate of the at least one sensor.

A specific example of step S1208 will be described with reference to FIG. 13b.

FIG. 13b is an Example in which the TCU Adjusts the Data Rate of the Table of FIG. 13a According to S1208 of FIG. 12b.

The TCU may determine the category and data rate set in each device as shown in FIG. 13a according to step S1204 or S1202. If, as a result of performing step S1207, the TCU determines that the sum of the data rates of the at least one camera and the at least one sensor is greater than the data rate assigned to the TCU, it is necessary for the TCU to reduce the sum of data rates of at least one camera and at least one sensor.

Specifically, the TCU may adjust the data rate of at least one camera and the data rate of at least one sensor in the same manner as in step S1204 described above with reference to the example of FIG. 13a. For reference, the TCU may use the data rate allocated to the TCU in step S1208 for the same purpose as the maximum data rate available for data transmission to the base station in step S1204.

For example, the TCU may adjust the data rate of the camera, the lidar sensor, and the radar sensor based on the priority of the camera, the lidar sensor, and the radar sensor and the data rate allocated to the TCU. The TCU may determine a plurality of category combinations of each device in order of priority so that a category of a device having a high priority is set to be higher than a category of a device having a low priority. Then, the TCU may calculate the sum of data rates according to the category combination of each device, and determine whether the calculated sum is equal to or less than the data rate allocated to the TCU. In addition, the TCU may adjust the data rate of at least one camera and the data rate of at least one sensor based on the category combination of each device that is equal to or less than the data rate allocated to the TCU.

For example, when the data rate allocated to the TCU is 1.3 Gbps, the TCU may adjust the data rate of at least one camera and the data rate of at least one sensor by determining a category combination as shown in the example of FIG. 13b. When the data rates of the category combination according to the example of FIG. 13b are summed, it can be seen that 500 Mbps+500 Mbps+100 Mbps+10 Mbps+100 Mbps+10 Mbps+1 Mbps=1.221 Gbps, which is less than 1.3 Gbps.

Alternatively, the TCU may use a combination of categories stored in the TCU described in step S1204. The TCU may select a category combination corresponding to the data rate assigned to the TCU from among the stored category combinations.

Alternatively, the TCU may lower the category of all devices by one step in step S1208 and determine whether the sum of data rates according to the category combination lowered by one step is smaller than the data rate allocated to the TCU. If the sum of the data rates according to the category combination lowered by one step is less than the data rate allocated to the TCU, the TCU may receive camera data and sensor data from at least one camera and at least one sensor based on the lowered category combination. When the sum of data rates according to the category combination lowered by one step is equal to or greater than the data rate allocated to the TCU, the TCU may lower the categories of all devices by one step again. Alternatively, the TCU may determine a category combination in which the sum of data rates according to the category combination lowered by one step is smaller than the data rate allocated to the TCU while lowering by one step from a category of a device having a lower priority.

Figure 14:
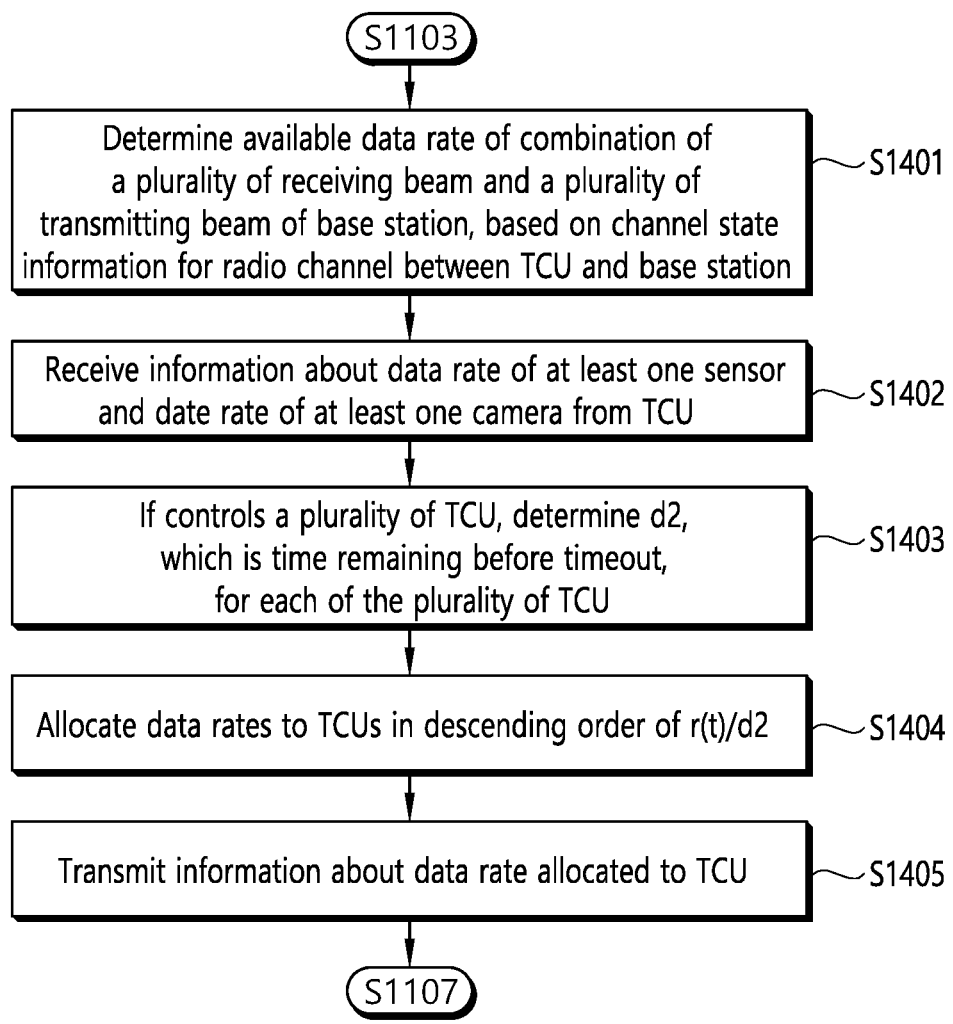
FIG. 14 is a flowchart illustrating an example of an operation performed by the MEC server after performing S1103 of FIG. 11.

FIG. 14 is a Flowchart Illustrating an Example of an Operation Performed by the MEC Server after Performing S1103 of FIG. 11.

Referring to FIG. 14, in step S1401, the MEC server may determine the available data rate for a combination of a plurality of receive beams of the base station and a plurality of transmit beams of the TCU based on state information on a radio channel between the TCU and the base station.

When the MEC server is connected to a plurality of TCUs, the MEC server may determine data rate group G_R(t)= $\{R_{1,1,1}(t), \ldots, R_{i,j,k}(t), \ldots R_{i\_max,j\_max,k\_max}(t)\}$ for each beam in the same manner as in the example of Table 1 based on the state information on the radio channel between the TCU and the base station. Here, i_max may be the maximum value of the TCU index, j_max may be the number of types of transceivers of TCU-i_max, and k_max may be the number of transmission beams of the transceiver corresponding to j_max among the transceivers of TCU-i_max.

In step S1402, the MEC server may receive information about the data rate of at least one camera and the data rate of at least one sensor from the TCU. The MEC server may receive information about the data rate of at least one camera and the data rate of at least one sensor transmitted by the TCU in step S1205.

Before performing step 1402, the MEC server may transmit a message requesting information about the data rate of at least one camera and the data rate of at least one sensor to the TCU. The MEC server may transmit a request message in a unicast manner.

When the MEC server is connected to a plurality of TCUs, the MEC server may receive information about a data rate of at least one camera and a data rate of at least one sensor from each of the plurality of TCUs. The MEC server may store the $r_i(t)$ transmitted by the TCU-I by putting it in the group $G_r(t)=\{r_1(t), \ldots, r_{i\_max}(t)\}$. Here, i_max may be the maximum value of the index of the TCU controlled by the MEC server.

In step S1403, when the MEC server controls a plurality of TCUs, for each of the plurality of TCUs, based on a delay requirement, the MEC server may determine the remaining time before a timeout occurs d2. For example, when the delay requirement of TCU-2 is 5 ms, and 2 ms has elapsed, the MEC server may determine d2 of TCU-2 to be 3 ms.

The MEC server may configure the group of TCU-i, X={TCU-1, TCU-2, . . . , TCU-i_max}, and generate Y={ }, which is a group to store the selected TCU-i*. Then, the MEC server may configure a group of beams B= $\{B_{1,1,1}(t), \ldots, B_{i,j,k}(t), \ldots B_{i\_max,j\_max,k\_max}(t)\}$ corresponding to each of G_R(t)=$\{R_{1,1,1}(t), \ldots, R_{i,j,k}(t), \ldots R_{i\_max,j\_max,k\_max}(t)\}$ of step S1401 and generate Y(t)={ }, which is a group to store the allocated beam.

For reference, step S1403 may be omitted when there is only one TCU connected to the MEC server.

In step S1404, the MEC server may allocate data rates to the TCUs in the order of $r_i(t)/d2$ being greater.

The MEC server may select TCUs as TCU-i* in the order of $r_i(t)/d2$, add them to Y={TCU-i*}, and delete TCU-i* from X. In order for the sum of the selected at least one $R_{i,j,k}(t)$ to be greater than $r_i(t)$, the MEC server may select at least one of $R_{i,j,k}(t)$ related to TCU-i* in G_R(t). Then, the MEC server may store the beam $B_{i,j,k}(t)$ corresponding to the selected at least one $R_{i,j,k}(t)$ in Y(t).

For example, the MEC server may select at least one $R_{i,j,k}(t)$ from the data rate having a small data rate value among $R_{i,j,k}(t)$ related to TCU-i* in G_R(t). In this case, by bundling beams of low data rate and using them for uplink transmission, the best beam may be reserved for communication with very high importance.

In step S1405, the MEC server may transmit information about the data rate allocated to the TCU. Here, the information on the data rate allocated to the TCU by the MEC server may include information on the transmission beam allocated to the TCU (that is, information on at least one beam $B_{i,j,k}(t)$ included in Y(t)) and information about data rate of each of transmission beam allocated to the TCU (that is, information about the data rate $R_{i,j,k}(t)$ corresponding to at least one beam $B_{i,j,k}(t)$ included in Y(t)).

According to the content described in the disclosure of the present specification, the TCU may transmit camera data and sensor data to the MEC server at a data rate of 20 Gbps or more.

According to the disclosure of the present specification, due to the increase in the uplink transmission capability of the TCU, the MEC server may increase the accuracy of object detection by using high-resolution camera data and sensor data.

According to the disclosure of the present specification, the TCU may transmit camera data or sensor data in high resolution in consideration of the importance of the camera and sensor mounted on the vehicle, the channel state between the TCU and the base station, or the driving state of the vehicle.

According to the content described in the disclosure of the present specification, the MEC server performs a function of fusing information analyzed from camera data and information analyzed from sensor data to remotely control the vehicle, thereby there is no need to install an auto driving system computer (ADSC) inside the vehicle. Accordingly, it is possible to lower the manufacturing cost of the autonomous vehicle.

Figure 15:
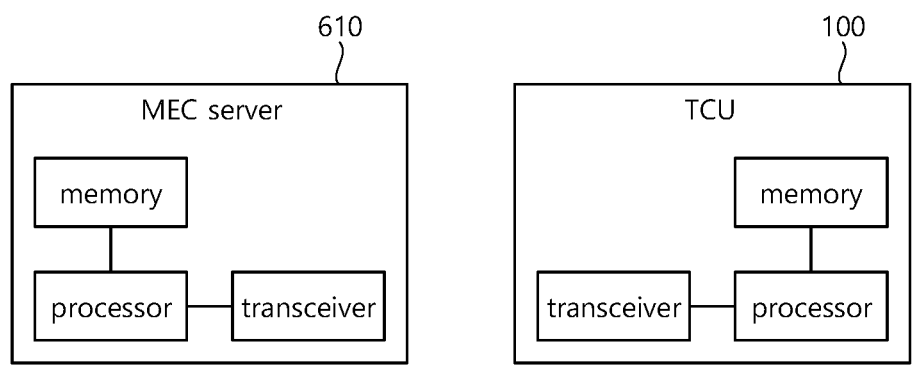
FIG. 15 is a configuration block diagram of an MEC server and a TCU according to an embodiment.

FIG. 15 is a Configuration Block Diagram of an MEC Server and a TCU According to an Embodiment.

Referring to FIG. 15, the MEC server 610 and the TCU 100 may include a memory, a processor, and a transceiver, respectively.

The illustrated processor, memory, and transceiver may each be implemented as separate chips, or at least two or more blocks/functions may be implemented through one chip.

The transceiver includes a transmitter and a receiver. When a specific operation is performed, only one operation of the transmitter and the receiver may be performed, or both the operation of the transmitter and the receiver may be performed. The transceiver may include one or more antennas for transmitting and/or receiving radio signals. In addition, the transceiver may include an amplifier for amplifying a received signal and/or a transmission signal and a band-pass filter for transmitting on a specific frequency band.

As described above, the transceiver of the TCU includes a first 5G transceiver (ie, a modem/antenna using sub 6 GHz), a second 5G transceiver (ie, a modem/antenna using mmWave), an LTE transceiver (ie, modem/antenna using LTE).

The processor may implement the functions, processes and/or methods proposed in this specification. The processor may include an encoder and a decoder. For example, the processor may perform an operation according to the above description. Such processors may include application-specific integrated circuits (ASICs), other chipsets, logic circuits, data processing devices, and/or converters that convert between baseband signals and radio signals.

Memory may include read-only memory (ROM), random access memory (RAM), flash memory, memory cards, storage media, and/or other storage devices.

Figure 16:
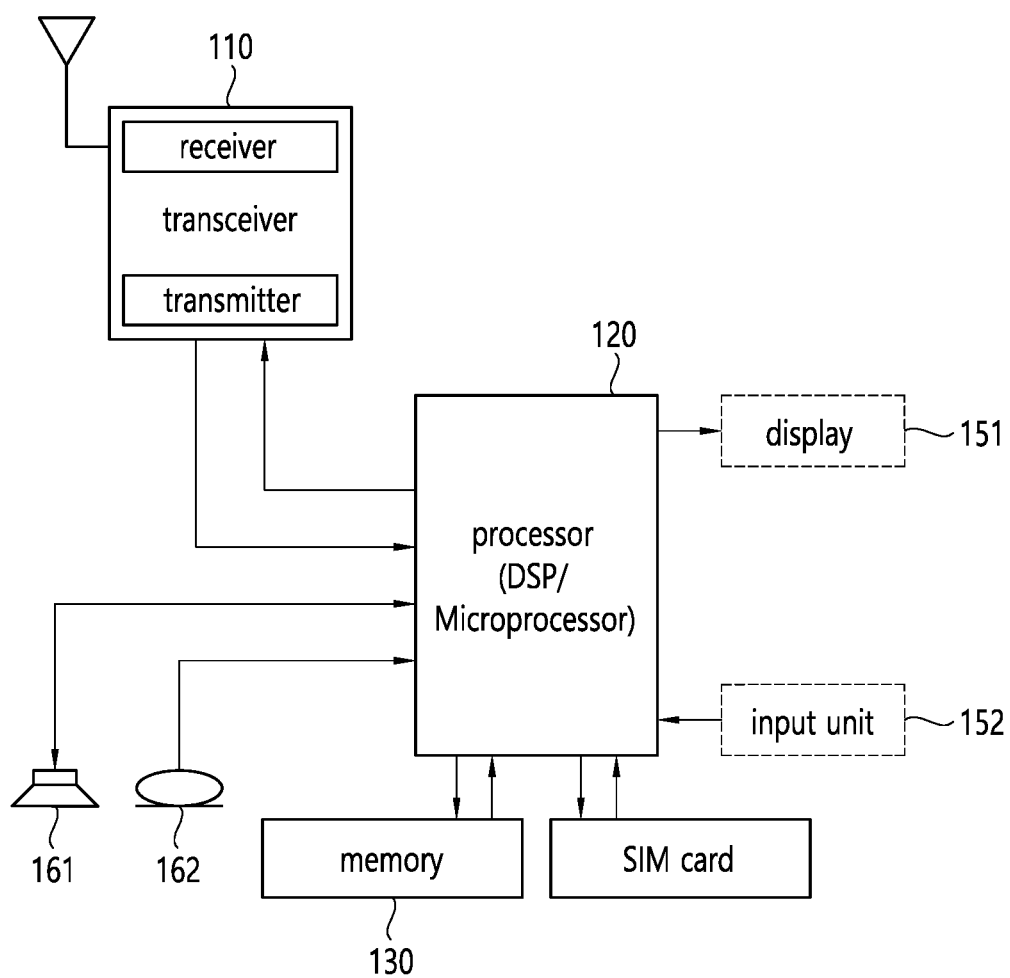
FIG. 16 is a block diagram illustrating in detail the configuration of a TCU according to an embodiment of the present disclosure.

FIG. 16 is a block diagram illustrating in detail the configuration of a TCU according to an embodiment of the present disclosure.

The illustrated TCU 100 includes a transceiver 110, a processor 120, a memory 130, one or more antennas, and a subscriber identification module (SIM) card.

The illustrated TCU 100 may further include a speaker 161 and a microphone 162 as necessary.

The illustrated TCU 100 may further include a display 151 and an input unit 152 as necessary.

The processor 120 may be configured to implement the proposed functions, procedures and/or methods described herein. The layers of the radio interface protocol may be implemented in the processor 120. The processor 120 may include an application-specific integrated circuit (ASIC), other chipsets, logic circuits, and/or data processing devices. The processor 102 may be an application processor (AP). The processor 120 may include at least one of a digital signal processor (DSP), a central processing unit (CPU), a graphics processing unit (GPU), and a modem (modulator and demodulator). Examples of processor 120 may be SNAPDRAGON™ series processors manufactured by Qualcomm®, EXYNOS™ series processors manufactured by Samsung®, A series processors manufactured by Apple®, HELIO™ series processors manufactured by MediaTek®, INTEL® It may be an ATOM™ series processor manufactured by the company or a corresponding next-generation processor.

The display 151 outputs the result processed by the processor 120. Input unit 152 receives input to be used by processor 120. The input unit 152 may be displayed on the display 151. A SIM card is an integrated circuit used to securely store an international mobile subscriber identity (IMSI) and its associated keys used to identify and authenticate subscribers in mobile phone devices such as mobile phones and computers. The SIM card may not be physically implemented, but may be implemented as a computer program and stored in the memory.

The memory 130 is operatively coupled to the processor 120 and stores various information for operating the processor 120. Memory 130 may include read-only memory (ROM), random access memory (RAM), flash memory, memory cards, storage media, and/or other storage devices. When the embodiment is implemented in software, the techniques described in this specification may be implemented in modules (eg, procedures, functions, etc.) that perform the functions described in this specification. Modules may be stored in memory 130 and executed by processor 120. The memory 130 may be implemented inside the processor 120. Alternatively, the memory 130 may be implemented outside the processor 120, and may be communicatively connected to the processor 120 through various means known in the art.

The transceiver 110 is operatively coupled to the processor 120 and transmits and/or receives a radio signal. The transceiver 110 includes a transmitter and a receiver. The transceiver 110 may include a baseband circuit for processing a radio frequency signal. The transceiver controls one or more antennas to transmit and/or receive radio signals.

The speaker 161 outputs sound related results processed by the processor 120. Microphone 162 receives sound related input to be used by processor 120.

In the above, preferred embodiments of the present disclosure have been exemplarily described, but the scope of the present disclosure is not limited only to such specific embodiments, and thus the present disclosure may be modified, changed, or improved in various forms within the spirit of the present disclosure and the scope described in the claims.

In the exemplary system described above, the methods are described on the basis of a flowchart as a series of steps or blocks, but the present disclosure is not limited to the order of steps, and some steps may occur in a different order or concurrently with other steps as described above. In addition, those skilled in the art will understand that the steps shown in the flowchart are not exhaustive and that other steps may be included or that one or more steps in the flowchart may be deleted without affecting the scope of the present disclosure.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method.

What is claimed is:

1. A Telematics Communication Unit (TCU) configured to be mounted on a vehicle, the TCU comprising:
    a plurality of transceivers including one or more antennas; and
    a processor for controlling the plurality of transceivers,
    wherein the processor is configured to perform operations that include:
    controlling the plurality of transceivers to receive, from a base station, channel state information on a radio channel between the TCU and the base station;
    determining a maximum data rate available for data transmission to the base station based on the received channel state information;
    determining a data rate of at least one camera mounted on the vehicle and a data rate of at least one sensor mounted on the vehicle;
    wherein the data rate of the at least one camera and the data rate of the at least one sensor are determined based on the determined maximum data rate and priorities for the at least one camera and the at least one sensor; and
    controlling the plurality of transceivers to receive camera data from the at least one camera based on the data rate of the at least one camera, and to receive sensor data from the at least one sensor based on the data rate of the at least one sensor.

2. The TCU of claim 1, wherein the operations further include:
    transmitting the received camera data and the received sensor data to the base station by controlling the plurality of transceivers.

3. The TCU of claim 2, wherein the operations further include:
    controlling the plurality of transceivers to transmit information on the data rate of the at least one camera and the data rate of the at least one sensor to the base station.

4. The TCU of claim 3, wherein the operations further include:
    controlling the plurality of transceivers to receive, from the base station, information on the data rate allocated to the TCU by a multi-access edge computing (MEC) server.

5. The TCU of claim 4, wherein the operations further include:
    adjusting the data rate of the at least one camera and the data rate of the at least one sensor based on the information on the data rate allocated to the TCU and the priority of the at least one camera and the at least one sensor.

6. The TCU of claim 1,
wherein the at least one sensor includes at least one RADAR sensor and at least one LIDAR sensor.

7. The TCU of claim 1, wherein the operations further include:
setting priorities for the at least one camera and the at least one sensor based on the driving speed of the vehicle.

8. The TCU of claim 1, wherein the operations further include:
controlling the plurality of transceivers to transmit a pilot signal to the base station,
wherein the received channel state information is generated by a Multi-access Edge Computing (MEC) server based on the pilot signal.

9. The TCU of claim 1, wherein at least one of a Domain Control Unit (DCU), an Electronic Control Unit (ECU), a Local Interconnect Network (LIN) Master, a LIN Slave, a Media Oriented System Transport (MOST) Master, a MOST Slave, an Ethernet Switch, a Radar Sensor, a LiDAR Sensor, a Camera, a TCU equipped with at least one of Audio, Video, Navigation (AVN), or a Rear Side Entertainment (RSE) are equipped in the vehicle.

10. The TCU of claim 1,
wherein the plurality of transceivers includes a long term evolution (LTE) transceiver, a 5G transceiver, and a Wi-Fi transceiver.

11. A server that controls a TCU (Telematics Communication Unit) Telematics Communication Unit (TCU) configured to be mounted on a vehicle in a next-generation mobile communication system, the server comprising:
a transceiver; and
a processor for controlling the transceiver, wherein the processor is configured to perform operations that include:
receiving, by the TCU, a pilot signal transmitted to a base station from a mobile communication network including the base station;
determining state information on a radio channel between the TCU and the base station based on the received pilot signal;
transmitting the determined state information on the radio channel to the mobile communication network including the base station;
receiving camera data and sensor data transmitted by the TCU from the mobile communication network including the base station;
generating control data for controlling driving of the vehicle based on the camera data and the sensor data; and
receiving information on a data rate of at least one camera mounted on the vehicle and a data rate of at least one sensor mounted on the vehicle.

12. The server of claim 11,
wherein the operations further include:
allocating a data rate to the TCU based on the sum of the data rate of the at least one camera and the data rate of the at least one sensor.

13. The server of claim 12,
wherein the operations further include:
controlling the transceiver to transmit information on the data rate allocated to the TCU to the TCU through the mobile communication network including the base station.

* * * * *